United States Patent [19]

Saito

[11] Patent Number: 5,838,834
[45] Date of Patent: Nov. 17, 1998

[54] IMAGE PROCESSING APPARATUS AND METHOD FOR QUANTIZING IMAGE DATA AND QUANTIZATION ERRORS USING SINGLE QUANTIZING UNIT AND PLURALITIES OF QUANTIZATION TABLES

[75] Inventor: Kazuhiro Saito, Yokohama, Japan

[73] Assignee: Canon Kabushiki Kaisha, Tokyo, Japan

[21] Appl. No.: 972,433

[22] Filed: Nov. 5, 1992

[30] Foreign Application Priority Data

| Nov. 7, 1991 | [JP] | Japan | 3-291454 |
| Jan. 21, 1992 | [JP] | Japan | 4-008152 |
| Jul. 31, 1992 | [JP] | Japan | 4-205248 |

[51] Int. Cl.⁶ ............ G06K 9/36; G06K 9/38; G06K 9/46
[52] U.S. Cl. ............ 382/25.1; 382/232; 382/243; 348/405
[58] Field of Search .................. 382/56, 50, 232, 382/251–253, 270–273; 358/133, 135, 136, 403, 404, 405, 426–433; 348/403–422; 345/202; 364/715.02

[56] References Cited

U.S. PATENT DOCUMENTS

| 3,215,773 | 11/1965 | Chatten et al. | 178/6 |
| 3,483,317 | 12/1969 | De Groat | 178/6 |
| 3,992,572 | 11/1976 | Nakagome et al. | 178/6 |
| 4,225,885 | 9/1980 | Lux et al. | 340/146.3 |
| 4,394,774 | 7/1983 | Widegren et al. | 382/56 |

(List continued on next page.)

FOREIGN PATENT DOCUMENTS

| 0469852 | 2/1992 | European Pat. Off. |  |
| 0487282 | 5/1992 | European Pat. Off. | G06F 15/64 |
| 0510933A1 | 10/1992 | European Pat. Off. |  |
| 2102240 | 1/1983 | United Kingdom. |  |
| 2259824 | 3/1993 | United Kingdom. |  |

OTHER PUBLICATIONS

K. Ogawa, et al., "A Single Chip Compression/Decompression LSI Based on JPEG", pp. 386–387, Int'l. Conf. on Consumer Electronics, Digest of Technical Papers, ICCE, 2–4 Jun. 1992, Rosemont, Ill.; IEEE, 1992.
Pat. Abs. Jp., vol. 016, No. 100 (P–1323) Mar. 11, 1992 (JP–A–03276263).
Pat. Abs. Jp., vol. 011, No. 276 (P–613) Sep. 8, 1987 (JP–A–62075733).
ICSSSP–89: 1989 Int. Conf. Acoustics, Speech and Signal Processing, May 23, 1989, pp. 1671–1674, vol. 3, Saito et al. "Self–organizing pattern–matching coding for picture signals".
Proc. I.R.E., vol. 40, No. 9, 1952, pp. 1098–1101, Huffman "A method for the construction of minimum–redundancy codes".
Pat. Abs. Jp., Col. 14, No. 354 (E–0958) Jul. 31, 1990 (JP–A–02122763).

*Primary Examiner*—Bipin Shalwala
*Attorney, Agent, or Firm*—Fitzpatrick, Cella, Harper & Scinto

[57] ABSTRACT

An image processing apparatus which temporarily stores frequency-converted data to quantize the data, encodes the quantized data, further, performs multistage quantization and coding based on quantization error generated in the quantization.

15 Claims, 17 Drawing Sheets

U.S. PATENT DOCUMENTS

| | | | |
|---|---|---|---|
| 4,546,385 | 10/1985 | Anastassiou | 358/133 |
| 4,586,082 | 4/1986 | Wilkinson | 382/252 |
| 4,772,956 | 9/1988 | Roche et al. | 358/260 |
| 4,920,426 | 4/1990 | Hatori et al. | 358/133 |
| 4,965,754 | 10/1990 | Stansfield et al. | 364/526 |
| 4,969,040 | 11/1990 | Gharavi | 358/135 |
| 4,987,480 | 1/1991 | Lippman et al. | 382/253 |
| 5,034,990 | 7/1991 | Klees | 382/252 |
| 5,038,390 | 8/1991 | Chandran | 382/56 |
| 5,040,233 | 8/1991 | Davy et al. | 382/56 |
| 5,047,852 | 9/1991 | Hanyu et al. | 358/133 |
| 5,063,608 | 11/1991 | Siegel | 382/56 |
| 5,073,820 | 12/1991 | Nakagawa et al. | 348/405 |
| 5,073,821 | 12/1991 | Juri | 358/133 |
| 5,086,439 | 2/1992 | Asai et al. | 375/122 |
| 5,086,488 | 2/1992 | Kato et al. | 382/56 |
| 5,101,280 | 3/1992 | Moronaga et al. | 358/426 |
| 5,109,451 | 4/1992 | Aono et al. | 382/41 |
| 5,148,271 | 9/1992 | Kato et al. | 358/133 |
| 5,148,498 | 9/1992 | Resnikoff et al. | 382/54 |
| 5,162,923 | 11/1992 | Yoshida et al. | 358/433 |
| 5,204,756 | 4/1993 | Chevion et al. | 358/426 |
| 5,216,518 | 6/1993 | Yamagami | 348/384 |
| 5,243,420 | 9/1993 | Hibi | 348/409 |
| 5,249,053 | 9/1993 | Jain | 348/231 |
| 5,249,066 | 9/1993 | Fukuda et al. | 358/433 |
| 5,253,075 | 10/1993 | Sugiyama | 358/433 |
| 5,267,333 | 11/1993 | Aono et al. | 382/56 |
| 5,295,203 | 3/1994 | Krause et al. | 382/56 |
| 5,301,040 | 4/1994 | Hoshi et al. | 358/465 |
| 5,307,163 | 4/1994 | Hatano et al. | 348/415 |
| 5,309,525 | 5/1994 | Shimomura et al. | 382/50 |
| 5,325,448 | 6/1994 | Katayama et al. | 382/252 |
| 5,339,164 | 8/1994 | Lim | 382/253 |
| 5,367,629 | 11/1994 | Chu et al. | 395/162 |
| 5,379,070 | 1/1995 | Retter et al. | 348/403 |
| 5,416,603 | 5/1995 | Suzuki et al. | 358/426 |
| 5,517,327 | 5/1996 | Nakatani et al. | 358/462 |
| 5,588,075 | 12/1996 | Chiba et al. | 382/239 |

STAGE (1)  ZZ(1), ZZ(2) --- ZZ(i-1)

STAGE (2)  ZZ(i), ZZ(i+1) --- ZZ(j-1)

STAGE (3)  ZZ(j), ZZ(j+1) --- ZZ(k-1)

STAGE (4)  ZZ(k), ZZ(k+1) --- ZZ(63)

ZZ(n) : n-TH QUANTIZATION COEFFICIENT IN ZIGZAG SCANNING

FIG. 8

HEADER OF IMAGE →→→ END OF IMAGE

| No. | 1 | 2 | 3 | 4 | 5 | 6 | 7 | 8 | 9 | 10 | 11 |
|---|---|---|---|---|---|---|---|---|---|---|---|
| STAGE (1) | 1 | S-1 | S-5 | S-8 | S-10 | S-14 | · | S-(N-1) | S-4 | S-15 | END |
| STAGE (2) | 1 | S-2 | S-6 | S-9 | S-13 | · | · | S-N | S-11 | END | END |
| STAGE (3) | 1 | S-3 | S-7 | S-12 | · | · | S-(N-2) | END | END | END | END |
| STAGE (4) | 0 | S-4 | S-11 | S-15 | · | · | | | | | |

{ 1 : STAGE USED
  0 : STAGE CANCELLED

STAGE (1)   $ZZ(1), ZZ(2) \cdots ZZ(i-1)$

STAGE (2)   $ZZ(i), ZZ(i+1) \cdots ZZ(j-1)$

STAGE (3)   $ZZ(j), ZZ(j+1) \cdots ZZ(k-1)$

STAGE (4)   $ZZ(k), ZZ(k+1) \cdots ZZ(63)$ $ZZ(n)$ : n-TH QUANTIZATION COEFFICIENT IN ZIGZAG SCANNING

IMAGE PROCESSING APPARATUS AND METHOD FOR QUANTIZING IMAGE DATA AND QUANTIZATION ERRORS USING SINGLE QUANTIZING UNIT AND PLURALITIES OF QUANTIZATION TABLES

BACKGROUND OF THE INVENTION

<Related Art>The present invention relates to an image processing method and apparatus for compressing image data.

In recent years, an adaptive discrete cosine transform (ADCT) compression scheme mainly for processing natural images has been proposed as a multi-level image data compression technique. In this compression scheme, the three primary colors R, G and B signals are converted into three color components Y, U and V. The luminance (=Y) signal is compressed while maintaining its resolution, while the chrominance (=U and V) signals are compressed by lowering their resolutions by subsampling. In the first step of the compression, the respective components are discrete cosine transformed using 8×8 blocks and converted into an 8×8 frequency spaces to obtain their DCT coefficients. In the next step, two kinds of quantization tables, for the luminance (Y) and the chrominance (U and V) are respectively prepared. The DCT coefficients are linearly quantized (divided) using 8×8 quantizing values obtained by multiplying the respective elements of the 8×8 quantization table by a quantizing factor. Thus quantization coefficients are obtained. In the third step, these quantization coefficients are encoded using Huffman coding scheme which is a variable length coding scheme.

The drawback of the above conventional compression scheme is the degradation of a reproduced image which may occur due to quantization errors. Especially, in compression of an image including natural images, character images, computer graphics and the like, many quantization errors occur at a portion of image data which does not match a current quantization table, as a result, degradation of the reproduced image corresponding to the above portion becomes worse.

Huffman coding scheme includes sequential coding scheme and progressive coding scheme. In sequential coding scheme, all 64 quantization coefficients quantized with respect to one block are encoded, and then quantization coefficients of the next block are encoded. In this coding, all the color components or some of the color components are encoded in one scanning. A reproduced image obtained by a procedure after this coding is displayed sequentially from the top in a subscanning direction.

In progressive coding, scanning of 64 quantization coefficients quantized with respect to one block is divided into several stages and quantizing is performed by stage. If the coding of the quantization coefficients is divided into five stages, the scanning should be performed five times. In this case, the reproduced image is displayed in a stepwise manner. More specifically, a rough reproduced image having the lowest resolution and tonality obtained from the first stage of scanning is displayed from the top to the bottom, next, the reproduced image from the second scanning having a resolution and tonality better than the image from the first stage is displayed, in like manner, five reproduced images are sequentially displayed.

However, in case where data compression is made in the conventional compression scheme, quantity of compressed data is unknown till the coding ends since Huffman coding scheme is a variable length coding scheme, and it is impossible to control the coding to obtain a target quantity of compressed data.

In case where progressive coding scheme in Huffman coding scheme is employed, much time is required for performing scanning plural times. In decoding, a memory having a large capacity for one image in which respective image data of the scannings are stored is required.

SUMMARY OF THE INVENTION

The present invention has been made in consideration of the above situation, and has as its object to provide an image processing apparatus and method capable of removing the aforementioned problems and drawbacks of the conventional technique.

Another object of the present invention is to provide an image processing apparatus and method capable of efficiently compressing image data and storing the compressed data.

Another object of the present invention is to provide an image processing apparatus comprising storage means for storing image data, first quantization means for quantizing the image data stored in said storage means, first coding means for encoding the image data quantized by said first quantization means, second quantization means for quantizing quantization error generated by said first quantization means, and second coding means for encoding the quantization error quantized by said second quantization means.

Still, another object of the present invention is to provide an image processing apparatus comprising first storage means for temporarily storing frequency-converted data, first quantization means for quantizing the data stored by said storage means, second storage means for storing quantization error generated by said quantization means, and second quantization means for quantizing quantization error generated by said first quantization means.

Another object of the present invention is to provide an image processing method comprising the steps of coding input frequency-converted data in stages respectively corresponding to each frequency component, storing the data coded in the respective stages independently into a plurality of storage area, and memorizing correspondence between the respective stages and the storage areas.

Further, another object of the present invention is to provide an image processing apparatus comprising memory means including a plurality of storage areas, coding means for encoding input frequency-converted data in quantization stages respectively corresponding to each frequency component, and writing means for writing the coded data obtained by said coding means into the plurality of storage areas respectively in accordance with the quantization stages, wherein, when writing of coded data in a second quantization stage into a second storage area is completed before writing of coded data in a first quantization stage into a first storage area is completed, said writing means writes the rest of coded data in the second quantization stage into an empty storage area among the plurality of storage areas.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates a segment information table for respective stages in the fourth embodiment;

DETAILED DESCRIPTION OF THE PREFERRED EMBODIMENTS

Preferred embodiments of the present invention will be described in detail in accordance with the accompanying drawings.

<First Embodiment>

A first embodiment of the present invention is arranged so that quantization errors can be reduced in a stepwise manner by a multistage quantizing and coding unit, preventing image degradation. Further, fixed length compression obtaining constant quantity of compressed data can be realized by controlling compressed data in each compression stage.

Figure 1:
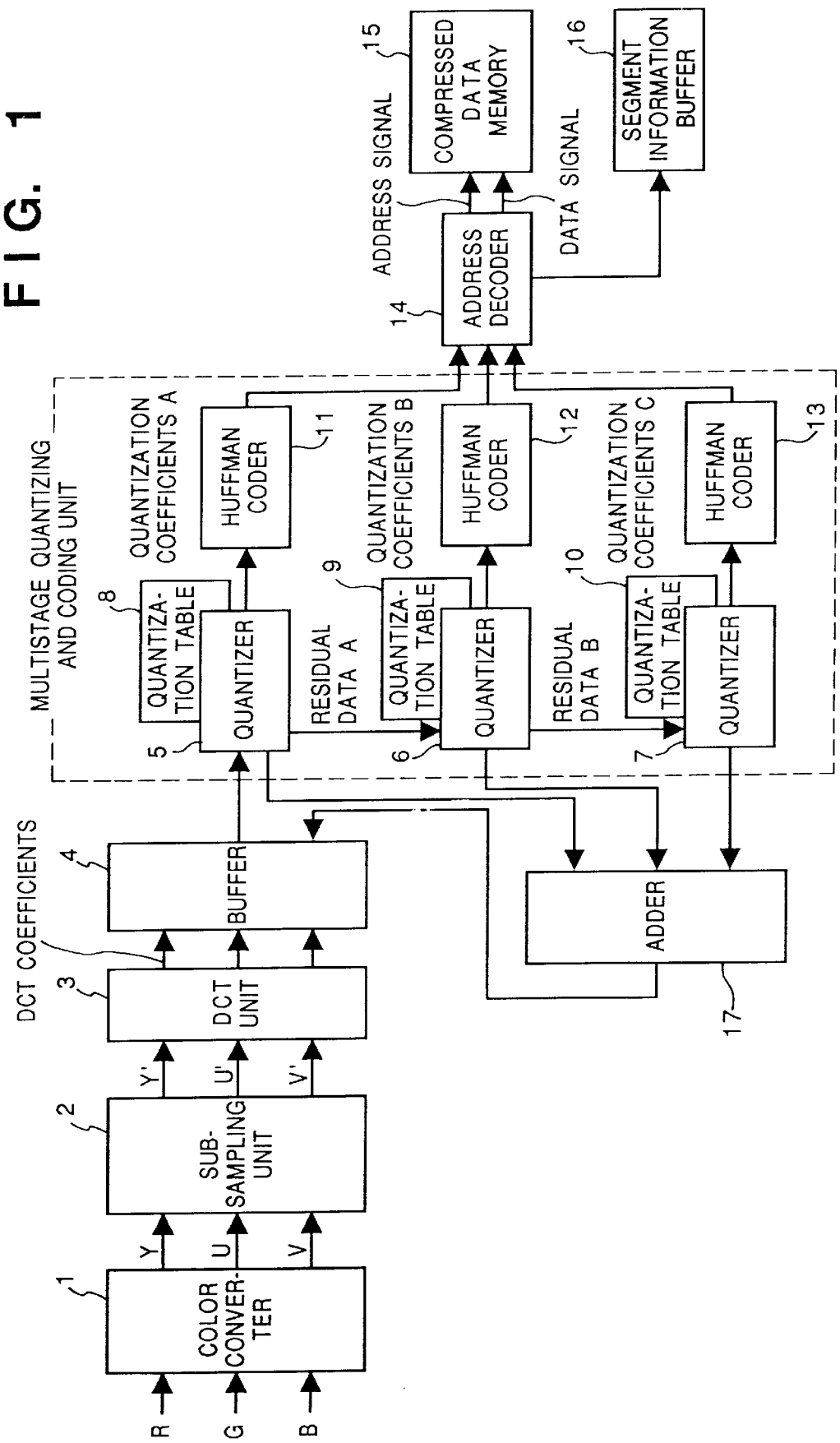
FIG. 1 is a block diagram showing a configuration of an image processing apparatus according to a first embodiment of the present invention.

FIG. 1 is a block diagram showing a configuration of an image processing apparatus according to the first embodiment. In FIG. 1, reference numeral 1 denotes a color converter; 2, a subsampling unit; 3, a DCT unit; 4, a buffer; 5, 6 and 7, quantizers; 8, 9 and 10, quantization tables; 11, 12 and 13, Huffman coders; 14, an address decoder; 15, a compressed data memory; 16, a segment information buffer; and 17, an adder.

The color converter 1 converts input RGB data into YUV data in following 3×3 matrix linear transformation:

$$\begin{bmatrix} Y \\ U \\ V \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (1)$$

Y denotes a luminance component, and U and V, chrominance components. It is known that human eye is more sensitive to the luminance component than to the chrominance components. The subsampling unit 2 subsamples the Y, U and V components as Y:U:V=4:1:1 or 4:2:2 based on the human eye sensitivity characteristics. Next, the DCT unit 3 performs discrete cosine transformation to the respective Y, U and V components in 8×8 block groups. Thus frequency-transformation is performed by 8×8 blocks and coefficients are obtained as DCT coefficients.

The DCT coefficients are temporarily written into the buffer 4 and quantized in a stepwise manner. More specifically, in the first stage of the multistage quantization, the quantizer 5 quantizes the respective YUV data read out of the buffer 4 by block using the quantization table 8. The quantization results as quantization coefficients A are encoded by the Huffman coder 11 and transferred to the address decoder 14. Further, quantization errors, i.e., residual data A are transferred to the quantizer 6.

In the second stage, the quantizer 6 quantizes the residual data A from the quantizer 5 using the quantization table 9. Quantization coefficients B obtained in this quantization are coded in the Huffman coder 12 and transferred to the address decoder 14. Quantization errors, i.e., residual data B are transferred to the quantizer 7.

In the third stage, the quantizer 7 quantizes the residual data B from the quantizer 6 using the quantization table 10. Quantization coefficients C obtained in this quantization are coded in the Huffman coder 13 and transferred to the address decoder 14.

In each quantization stage, the address decoder 14 writes the Huffman-coded data into the compressed data memory 15 and also writes information indicative of corresponding stage of the compressed data into the segment information buffer 16.

In the conventional scheme, quantization is performed in only one stage, as a result, degradation (loss) of information quantity due to quantization errors becomes worse. However, in this embodiment, as quantization is performed in the respective stages, quantity of data reduced through the second and third stages can be stored, substantially preventing image degradation.

According to this embodiment, in the first stage of quantization, a quantization table for coefficients to conserve information quantity of lower frequency space is employed, in the second stage, a quantization table for coefficients to conserve information quantity of intermediate frequency space is employed, and in the third stage, a quantization table for coefficients to conserve information quantity of higher frequency space is employed. By this arrangement, quantizing characteristic can be changed based on the quantization table of the current quantization stage. If image data to be processed include mainly frequency space equal to or lower than intermediate frequency, only the first and the second quantization stages are applied. In this manner, quantization stages can be selected in accordance with an object image.

Further, by changing quantization tables of the respective stages, quantity of compressed data in the respective stages can be changed. Accordingly, fixed length coding can be realized. For example, in a case where ratio of compressed data in the first, second and third stages is set as 3:2:1, if the quantity of the whole compressed data is smaller than a target quantity of compressed data, the whole compressed data can be employed. If there is a 10 percent excess over the target quantity, compressed data in the third stage can be deleted to obtain compressed data of the target quantity.

In this embodiment, as the YUV data are encoded in the same coding scheme, the configuration can be simplified by omitting common circuits.

It should be noted that in expanding (decompressing) the compressed data, the Huffman coders 11, 12 and 13 in FIG. 1 are made into Huffman decoders 11', 12' and 13' (not shown); the quantizers 5, 6 and 7, into inverse quantizers 5', 6' and 7' (not shown); the quantization tables 8, 9 and 10, into inverse quantization tables 8', 9' and 10' (not shown); and the DCT unit 3, into an inverse DCT unit 3' (not shown).

In the above arrangement for data expansion, the address decoder 14 transfers coded data from the respective quantization stages from the compressed data memory 15 to the Huffman decoders 11', 12' and 13' in accordance with information from the segment information buffer 16. The Huffman decoders 11', 12' and 13' respectively decode the coded data and transfer the data to the inverse quantizers 5', 6' and 7'. The inverse quantizers 5', 6' and 7' inversely quantize the respective quantization coefficients and transfer the results of the inverse quantization to the adder 17, which adds the results by pixel for the respective color components and transfers the added data to the buffer 4. The inverse DCT unit reads the data out of the buffer 4 and performs inverse discrete cosine transformation. In the subsampling unit 2, if subsampling ratio is 4:1:1, subsampling Y1, Y2, Y3, Y4, U1, V1 . . . is changed into Y1, Y2, Y3, Y4, U1, U1, U1, U1, V1, V1, V1, V1 . . . , if 4:2:2, Y1, Y2, U1, V1 . . . is changed into Y1, Y2, U1, U1, V1, V1 . . . The color converter 1 performs inverse conversion by the expression (1).

As described above, in the first embodiment, the three quantization stages are employed, however, the present invention is not limited to the three stages. For example, four or more quantization stages can be employed.

<Second Embodiment>

Figure 2:
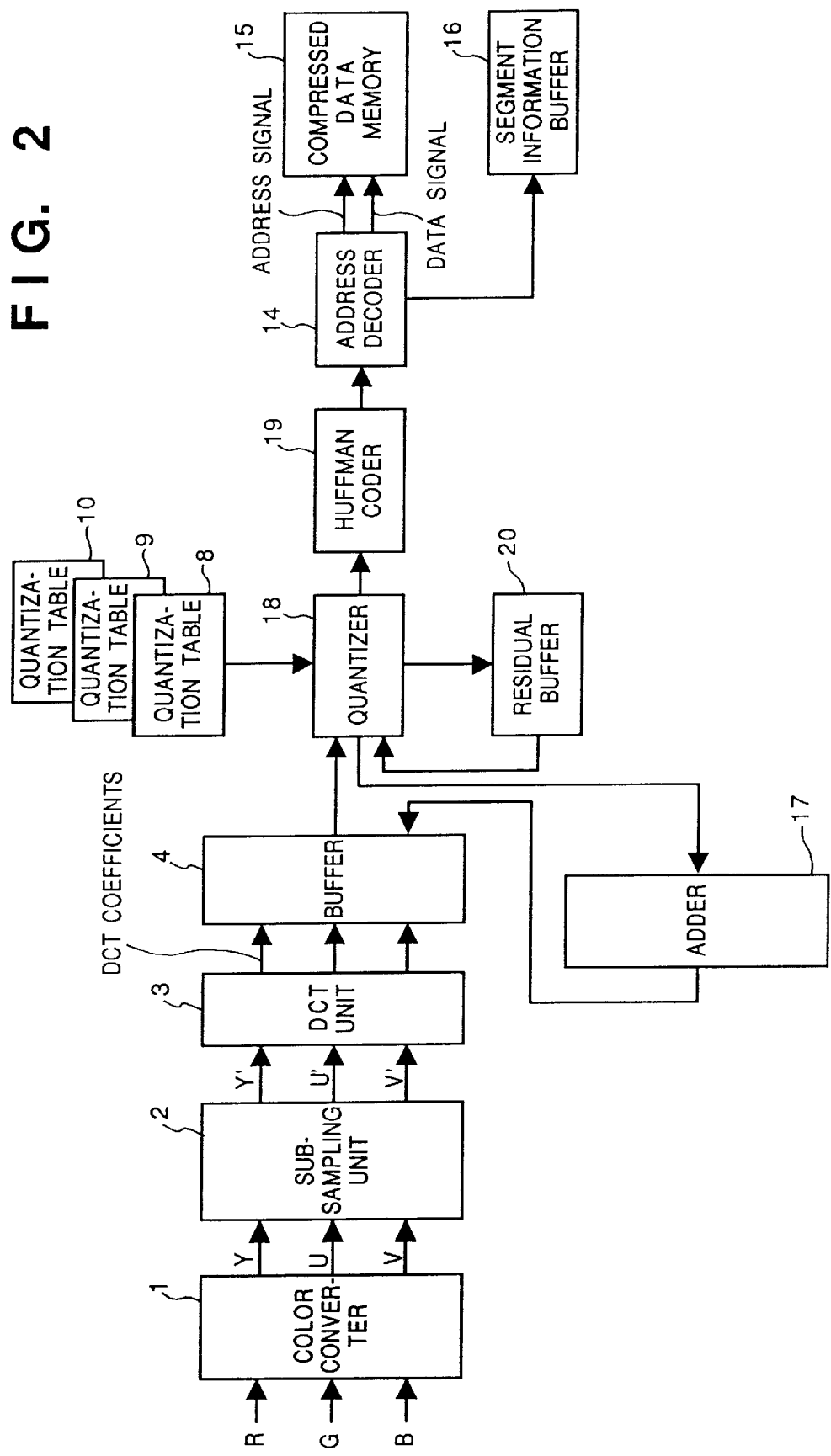
FIG. 2 is a block diagram showing a configuration of an image processing apparatus according to a second embodiment of the present invention.

FIG. 2 is a block diagram showing a configuration of an image processing apparatus according to a second embodiment of the present invention. In FIG. 2, the same reference numerals as those in FIG. 1 denote the corresponding elements and therefore the explanations of these numerals will be omitted.

In this embodiment, by employing a residual buffer 20, multistage quantization can be performed by the quantization tables 8, 9 and 10, the quantizer 18 and the Huffman coder 19. The above arrangement can simplify the configuration of the multistage quantizing and coding unit in FIG. 1.

The quantization process and inverse quantization process in this embodiment will be described below.

In the first stage of quantization, the quantizer 18 performs quantization using the quantization table 8. The quantization results are encoded by the Huffman coder 19 and quantization errors as residual data are written into the residual buffer 20. In the second stage, the quantizer 18 quantizes the residual data from the residual buffer 20 using the quantization table 9 and the Huffman coder 19 encodes the quantization results. Quantization errors as residual data in this quantization are written into the residual buffer 20. The process can be repeated in a similar manner if necessary, realizing the multistage quantization.

As for expansion of the compressed data, an inverse quantizer 181 (not shown) is arranged with respect to the quantizer 18; inverse quantization tables 8', 9' and 10' (not shown), with respect to the quantization tables 8, 9 and 10; and a Huffman decoder 19' (not shown), with respect to the Huffman coder 19.

The inverse quantizer 18' performs inverse quantization to quantization coefficients from the Huffman decoder 19' selecting and using one of the inverse quantization tables 8', 9' and 10', and transfers the inverse quantization results to the adder 17. Adder 17 adds the quantization coefficients of respective stages and sends the adding result to buffer 4.

Although three quantization stages are employed in the second embodiment, the present invention is not limited to the three stages. For example, four or more quantization stages can be made.

<Third Embodiment>

Figure 3:
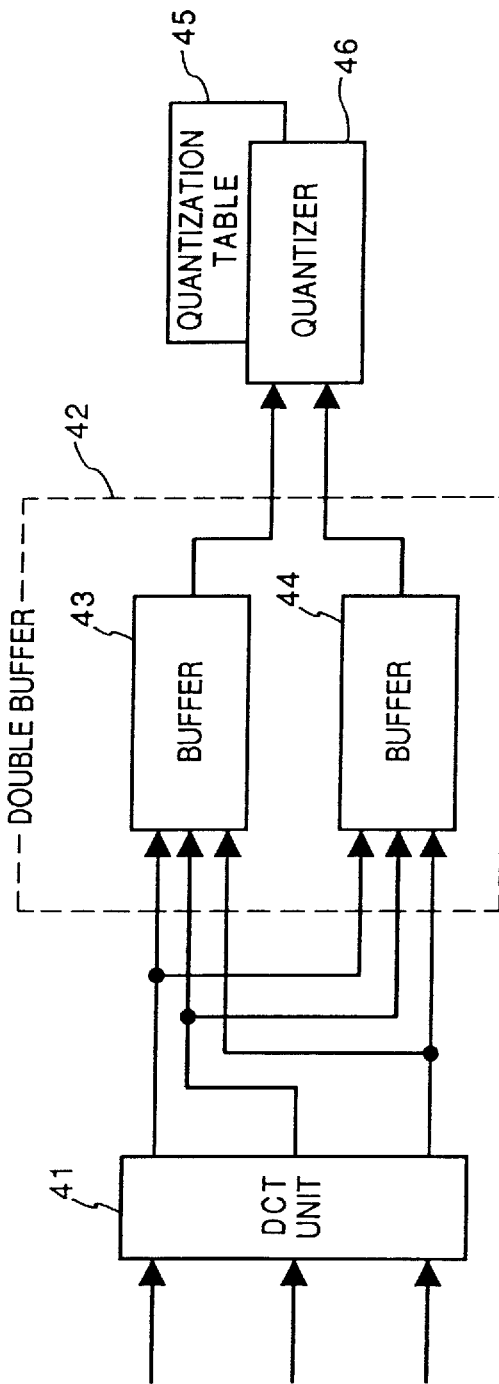
FIG. 3 is a block diagram showing a configuration of a significant portion of an image processing apparatus according to a third embodiment of the present invention.

FIG. 3 is a block diagram showing a configuration of a significant portion of an image processing apparatus according to a third embodiment of the present invention. In FIG. 3, reference numeral 41 denotes a DCT unit; 42, a double buffer; 43 and 44, buffers; 45, a quantization table; and 46, a quantizer.

In this embodiment, the double buffer 42 is employed in place of the buffer 4 in the first and second embodiments. By using the buffers 43 and 44 alternatively, efficiency of discrete cosine transformation in the DCT unit 41 and quantization by the quantizer 46 can be improved.

<Fourth Embodiment>

Figure 4:
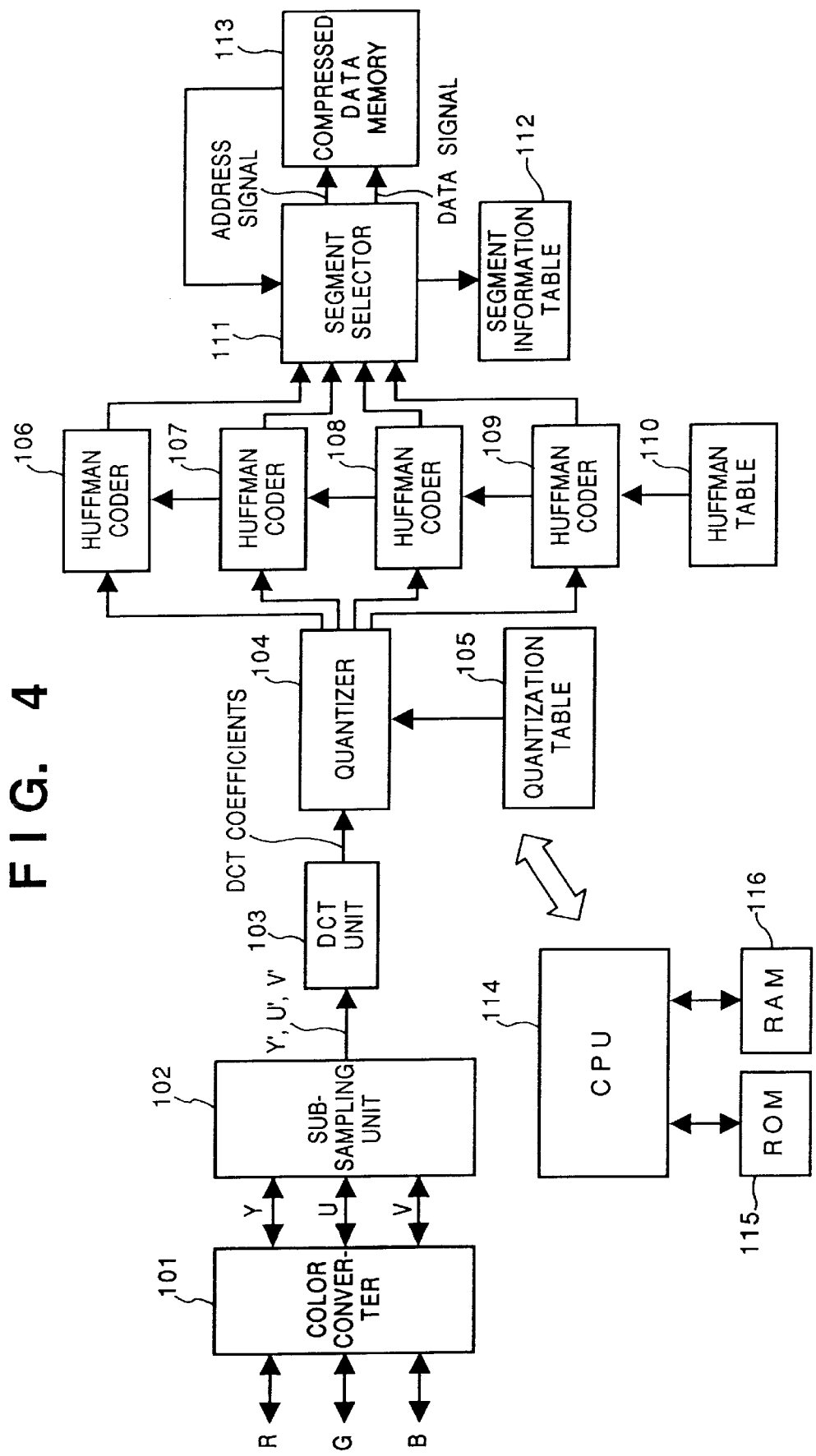
FIG. 4 is a block diagram showing a configuration of an image processing apparatus according to a fourth embodiment of the present invention.
Figure 9:
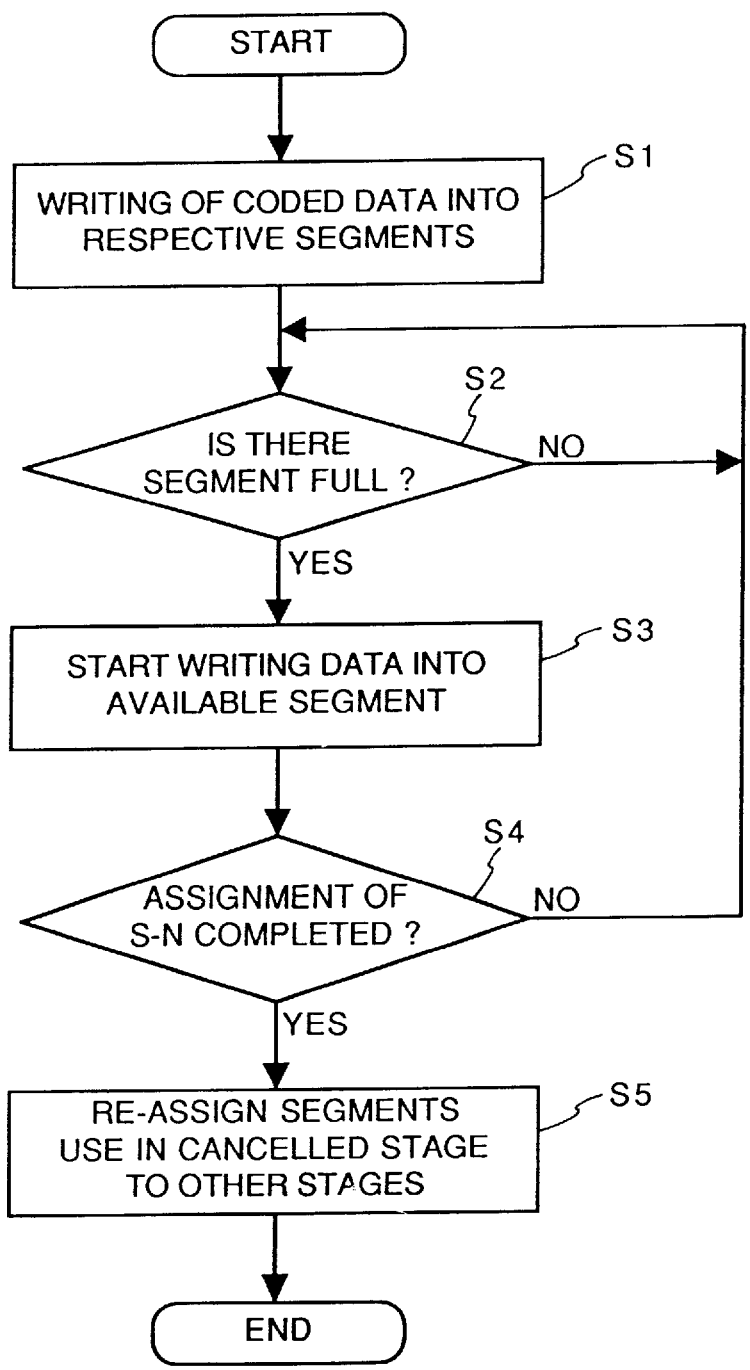
FIG. 9 is a flowchart showing a compression process in the fourth embodiment.

FIG. 4 is a block diagram showing a configuration of an image processing apparatus according to a fourth embodiment of the present invention. In FIG. 4, reference numeral 101 denotes a color converter; 102, a subsampling unit; 103, a DCT unit; 104, a quantizer; 105, a quantization table; 106 to 109, Huffman coders; 110, a Huffman table; 111, a segment selector; 112, a segment information table; 113, a compressed data memory; 114, a CPU for controlling the overall apparatus; 115, a ROM where data such as a program for operation of the CPU 114 according to a flowchart in FIG. 9 are stored; and 116, a RAM employed as a work area for various programs. The operation of the apparatus having the above construction will be described below.

Figure 5:
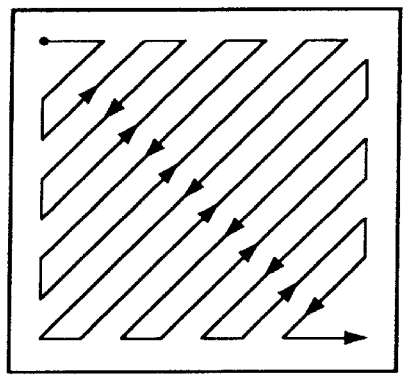
FIG. 5 illustrates zigzag scanning of quantization coefficients in the fourth embodiment.
Figure 6:
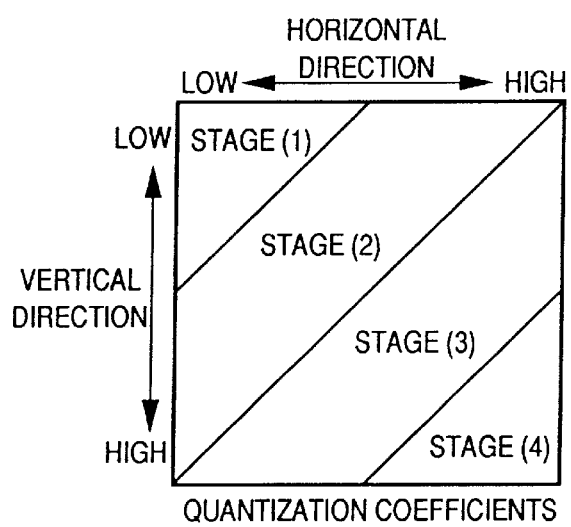
FIG. 6 illustrates a structure of progressive coding stages and quantization coefficients used in the fourth embodiment.
Figure 7:
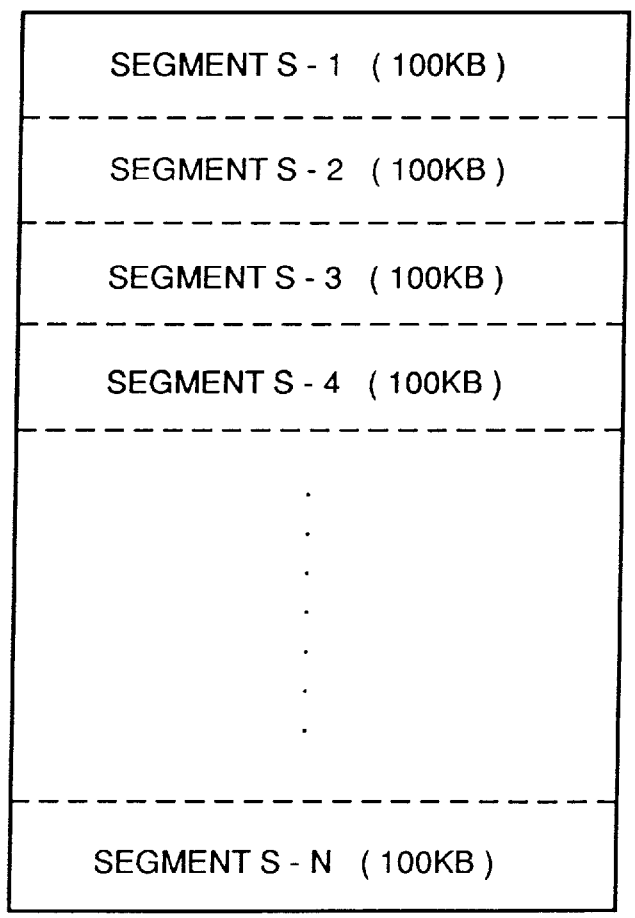
FIG. 7 illustrates contents of a compressed data memory in the fourth embodiment.

FIG. 5 shows zigzag scanning of quantization coefficients in the fourth embodiment. FIG. 6 illustrates a structure of progressive coding stages and quantization coefficients in this embodiment. FIG. 7 shows a content of a compressed data memory in this embodiment. FIG. 8 illustrates a segment information table for respective stages.

In the color converter 101, RGB data are converted into YUV data by a 3×3 matrix linear transformation as the expression (1) in the first embodiment. In the subsampling unit 102, a subsampling of the YUV data based on the aforementioned characteristics of a human eye which is more sensitive to a Y component than U and V components is performed. The ratio of the YUV components in the conversion and the subsampling is Y:U:V=4:1:1 or 4:2:2. Next, in the DCT unit 103, discrete cosine transformation is performed to the respective Y, U and V components by 8×8 blocks and frequency conversion is performed by 8×8 blocks. Hereinafter, the coefficients obtained by the frequency conversion are referred to as DCT coefficients.

In the quantizer 104, the DCT coefficients are quantized by 8×8 blocks using the quantization table 105. Hereinafter, the coefficients obtained by the quantization are referred to as quantization coefficients. The 8×8 quantization coefficients are one-dimensionally arranged from lower frequency components to higher frequency components obtained by zigzag scanning as shown in FIG. 5. In progressive coding, these one-dimensionally arranged quantization coefficients from the lower frequency components to the higher frequency components are assigned into several stages (stage (1) to (4) in FIG. 8). The Huffman coder 106 performs coding in the stage (1); the Huffman coder 107, for the stage (2); the Huffman coder 108, for the stage (3); and the Huffman coder 109, for the stage (4). Note that the Huffman coders 106 to 109 all employ the same Huffman table 110. Hereinafter, the data obtained by the Huffman codings are referred to as coded data.

As shown in FIG. 7, the compressed data memory 113 has a structure where the segment (e.g., 1 segment=100 KB) is partitioned into S-1 to S-N. The segment information table 112 has a structure as shown in FIG. 8. The first to fourth rows of the segment information table 112 respectively correspond to the stages (1) to (4). Numerals (S-1 to S-N) in each cell indicates a number of a selected segment in the compressed data memory 113 into which coded data from the respective stages are written, and a left-to-right direction of the table corresponds to a header-to-end direction of an image. Further, END in the table indicates that writing of coded data in a current stage has been completed.

Next, a writing procedure of coded data into the compressed data memory 113 by stage will be described with reference to FIG. 9 which is a flowchart showing a compression process according to the fourth embodiment.

In the fourth embodiment, coding amount in the respective stages are different due to Huffman coding scheme which is a variable length coding scheme. Coding amount is dependent on original image data, however, in case a natural image is used as an original, coding power is generally concentrated on lower frequency components. Accordingly, if the stages (1) to (4) are compared, the coding amount in the stage (1) is larger than that in the stage (4).

The flowchart of FIG. 9 will be described using FIG. 8.

As shown in the second column (No. 2) of the table in FIG. 8, coded data outputted in the stages are written into segments S-1, S-2, S-3 and S-4 respectively. In stage (1) where lower frequency component data are coded, the segment S-1 becomes full earlier than the segments in the other stages. In this stage, writing data into a segment S-5 is started earlier. Thereafter, in the stages (2) and (3), the segments S-2 and S-3 become full, then writing data into segments S-6 and S-7 are started (Step S1).

The segment S-5 in the stage (1) becomes full before the writing of data into the segment S-4 in the stage (4) is ended. As described above, coding amount generated in the stage (1) is larger than that in the stage (4), an empty segment S-8 is not assigned to the stage (4), but to the stage (1). In the respective stages, when a segment into which coded data are being written becomes full, an empty segment is selected and coded data are written into the selected segment (Steps 2 to 4).

In this embodiment, data of an original image are encoded in several stages. If quantity of coded data in the stages is respectively larger than a target amount of compressed (coded) data memory, none of the stages is cancelled, however, if the quantity of data reaches the target amount while image data are being coded, the designated subsequent stage is "cancelled". In FIG. 8, the segments S-4, S-11, S-15 . . . assigned to the "cancelled" stage (4) are re-assigned to the other stages as shown in columns 8 to 11.

In column 8, a segment S-N is assigned to the stage (2), meaning that all the segments in the compressed data memory 113 are assigned. In order to make more memory supplementarily available, the stage (4) in advance is cancelled ("0"), the segment S-4 assigned to the stage (4) is re-assigned to the stage (1) and the segment S-11 is re-assigned to the stage (2) as shown in column 9. The coding in the stage (2) is completed at the segment S-11, the subsequent cells of the stage (2) are marked with "END". As shown in column 10, the segment S-15 which has been assigned to the stage (4) is re-assigned to the stage (1) and the coding is completed, the next cell is marked with "END" (Step S5).

In expanding of the compressed data stored in the compressed data memory 113, only the "used" ("1") stages (1) to (3) are employed for decoding the compressed data. In place of the Huffman coders 106 to 109, four Huffman decoders are employed; in place of the Huffman table 110, a Huffman decoding table; in place of the quantizer 104, an inverse quantizer; in place of the quantization table 105, an inverse quantization table; and in place of the DCT unit 103, an inverse DCT unit.

In this case, the segment selector 111 transfers coded data from the respective stages from the compressed data memory 113 to the four Huffman decoders in accordance with the segment information table 112. The four Huffman decoders decode the coded data using the Huffman decoding table and transfer the decoded data to the inverse quantizer. The inverse quantizer performs inverse quantization by 8×8 blocks to the decoded data. In the inverse DCT unit, inverse discrete transformation by 8×8 blocks is performed to the data from the inverse quantizer. In the subsampling unit in expanding process, if the subsampling ratio is 4:1:1, Y1, Y2, Y3, Y4, U1, V1 . . . is changed into Y1, Y2, Y3, Y4, U1, U1, U1, U1, V1, V1, V1, V1 . . . , if the ratio is 4:2:2, Y1, Y2, U1, V1 . . . is changed into Y1, Y2, U1, U1, V1, V1 . . . Further, in the color converter in expanding process, an inverse transformation of the expression (1) is performed. The expansion of compressed data is performed in the above-described manner.

In this embodiment, progressive coding (Huffman coding) is performed in one scanning using the compressed data memory 113 partitioned into a plurality of segments and the segment selector 111 for selecting a segment and the segment information table 112 into which the segment information is stored. Thus, scanning time can be shortened by reduction of the number of times of scanning, and a memory having a large capacity for one image can be omitted. Further, fixed length compression can be realized.

<Fifth Embodiment>

Next, a fifth embodiment of the present invention will be described.

Figure 10:
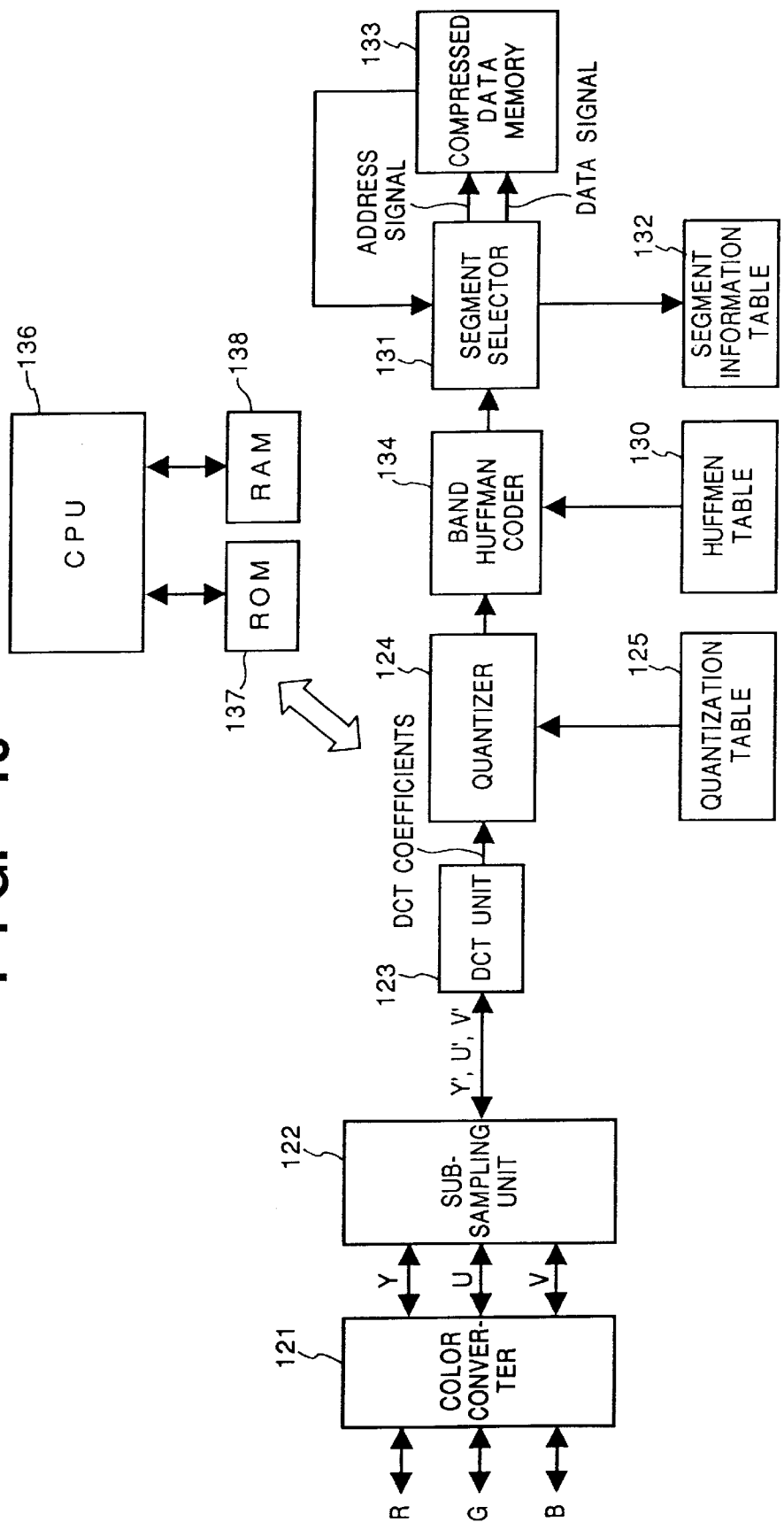
FIG. 10 is a block diagram showing a configuration of an image processing apparatus according to a fifth embodiment of the present invention.

FIG. 10 is a block diagram showing a configuration of an image processing apparatus according to the fifth embodiment of the present invention. In FIG. 10, reference numeral 121 is a color converter; 122, a subsampling unit; 123, a DCT unit; 124, a quantizer; 125, a quantization table; 134, a band Huffman coder; 130, a Huffman table; 131, a segment selector; 132, a segment information table; 133, a compressed data memory; 136, a CPU for controlling the overall apparatus; 137, a ROM in which data such as a program for operation of the CPU 136 are stored; and 138, a RAM employed as a work area for various programs. Note that in FIG. 10, circuits having the same names as those in FIG. 4 function similarly to those in the fourth embodiment.

In this embodiment, a plurality of Huffman coders in FIG. 4 are replaced with the band Huffman coder 134 in order to simplify the circuit configuration of the progressive coding in the fourth embodiment.

Next, writing procedure of coded data into the compressed data memory 133 by stage will be described.

Quantization coefficients quantized by the quantizer 124 are inputted into the band Huffman coder 134 sequentially from the lower frequency components by zigzag scanning. The band Huffman coder 134 performs Huffman coding to the data from the lower frequency components. Similarly to the fourth embodiment, when coding of the data within the stage (1) area is completed, the segment selector 131 selects a segment S-1. The coded data obtained from the Huffman coding are transferred to the selected segment S-1. The numeral "S-1" as a segment number is written into the segment information table 132.

Next, the band Huffman coder 134 encodes data within the stage (2) area and the segment selector 131 selects a segment S-2. The coded data are transferred to the segment S-2 and numeral S-2 is written into the segment information table 132. Similarly, the band Huffman coder 134 encodes data within the stage (3) area and the segment selector 131 selects a segment S-3. The coded data are transferred to the segment S-3, and numeral S-3 is written into the segment information table 132. In this manner, the band Huffman coder 134 is employed for coding quantization coefficients sequentially transferred from lower frequency components by stage, the segment selector 131 selects a segment, and the segment number is written into the segment information table, realizing progressive coding similar to that in the fourth embodiment.

<Sixth Embodiment>

Next, a sixth embodiment will be described below.

Figure 11:
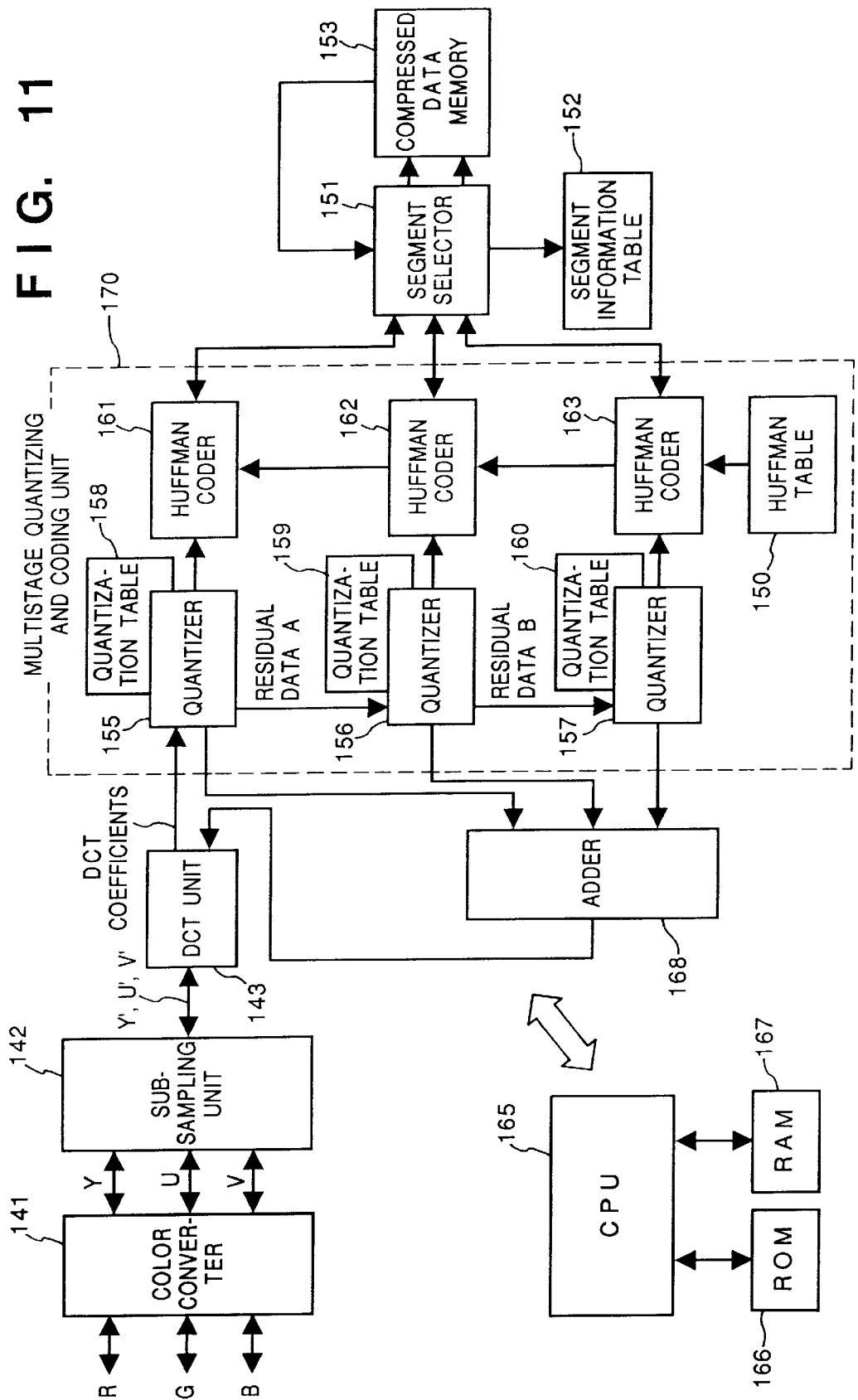
FIG. 11 is a block diagram showing a configuration of an image processing apparatus according to a sixth embodiment of the present invention.

FIG. 11 is a block diagram showing a configuration of an image processing apparatus according to the sixth embodiment of the present invention. In FIG. 11, reference numeral 141 denotes a color converter; 142, a subsampling unit; 143, a DCT unit; 155 to 157, quantizers; 158 to 160, quantization tables respectively corresponding to the quantizers 155 to 157; 161 to 163, Huffman coders; 150, a Huffman table; 151, a segment selector; 152, a segment information table; 153, a compressed data memory; 165, a CPU for controlling the overall apparatus; 166, a ROM in which data such as a program for operation of the CPU 165 are stored; 167, a RAM employed as a work area for various programs; and 168, an adder. Further, a multistage quantizing and coding unit 170 includes the quantizers 155 to 157, the quantization tables 158 to 160, the Huffman coders 161 to 163 and the Huffman table 150. Note that circuits with the same names as those in FIG. 4 have the same functions.

Next, writing procedure of coded data into the compressed data memory 153 by stage will be described below.

DCT coefficients discrete cosine transformed by the DCT unit 143 are transferred to the multistage quantizing and coding unit 170 and quantized and coded as described below.

In the first stage, the DCT coefficients are quantized by the quantizer 155 using the quantization table 158 by 8×8 blocks with respect to respective color components (Y, U and V). The quantization results as quantization coefficients are encoded by the Huffman coder 161. The coded data are transferred to a segment S-1 selected by the segment selector 151 in the compressed data memory 153, and the segment number "S-1" is written into the segment information table 152. Further, quantization errors as residual data A generated in the quantization are transferred to the quantizer 156.

Next, in the second stage, the quantizer 156 quantizes the residual data A from the quantizer 155 using the quantization table 159. The obtained quantization coefficients are encoded by the Huffman coder 162. The coded data are transferred to a segment S-2 selected by the segment selector 151 in the compressed data memory 153, and the segment number "S-2" is written into the segment information table 152. Quantization errors generated in the quantization as residual data B are transferred to the quantizer 157.

In the third stage, the quantizer 157 quantizes the residual data B from the quantizer 156 using the quantization table 160. The obtained quantization coefficients are encoded by the Huffman coder 163. The coded data are transferred to a segment S-3 selected by the segment selector 151 in the compressed data memory 153 and the segment number "S-3" is written into the segment information table 152.

As described above, similarly to the fourth embodiment, by using the compressed data memory 153, the segment selector 151 for selecting a segment and the segment information table 152, fixed length compression can be realized.

In the conventional scheme, degradation (loss) of information quantity becomes worse since quantization is performed in only one stage. However, in the sixth embodiment, information quantity is reduced through the quantization of the second and third stages, substantially preventing degradation of image quality.

Further, in the first stage, quantization is performed using a quantization table to conserve information quantity of lower frequency space, in the second stage, quantization is performed using a quantization table to conserve information quantity of intermediate frequency space, and in the third stage, quantization is performed using a quantization table to conserve information quantity of higher frequency space. By this arrangement, quantization characteristics can be varied corresponding to the respective stages. Accordingly, the multistage quantization can be applied flexibly in accordance with an object. For example, to an image including mainly space equal to or lower than intermediate frequency space, quantization to the second stage is employed.

Further, by changing a quantization table in the respective stages, quantity of compressed data in the respective stages can be changed, realizing more precise fixed length compression. For example, in case where quantity of compressed data in the first to third stages is set as 3:2:1, if quantity of the whole compressed data is smaller than a target compressed data quantity, the whole compressed data can be employed. However, if the quantity of the whole compressed data exceeds by 10 percent of the target quantity, the compressed data by the third stage can be deleted to obtain the target quantity.

In expanding compressed data, in place of the Huffman coders 161 to 163, three Huffman decoders can be arranged; in place of the quantizers 155 to 157, three inverse quantizers; in place of the quantization tables 158 to 160, three inverse quantization tables; in place of the DCT unit 143, an inverse DCT unit; in place of the adder 168, an adder for this procedure.

The expanding procedure will be briefly described below.

The segment selector 151 transfers coded data from the respective stages from the compressed data memory 153 to the three Huffman decoders in accordance with the segment information table 152. The three Huffman decoders respectively decode the coded data and transfer the data to the three inverse quantizers, which inversely quantize the obtained quantization coefficients, and transfer the results of the inverse quantization to the adder for the data expansion. The adder adds the inverse quantization results from the three inverse quantizers by 8×8 blocks and transfers the results of the addition to the inverse DCT unit. Thereafter, a process similar to that in the fifth embodiment will follow. As described above, compressed data can be expanded in this manner.

<Seventh Embodiment>

In the fourth embodiment, in case all the segments in the compressed data memory become full, the stages are "cancelled" from a stage for coded data of higher frequency components. However, the present invention is not limited to this arrangement, a stage to be "cancelled" can be selected in accordance with an original image, e.g., from a stage for lower frequency component data or intermediate frequency component data.

<Eighth Embodiment>

In the first to seventh embodiments, the number of progressive coding stages are four, however, the present invention is not limited to this number of stages. For example, the stages may be two or three, or more than four, unless the number deviates from the scope of the invention.

<Ninth Embodiment>

In the first to the seventh embodiments, the segment information table is as shown in FIG. 8, however, the present invention is not limited to this table, various modifications to the table can be made if they are within the scope of the present invention.

An example of the segment information table other than that as shown in FIG. 8 will be described with reference to FIG. 12.

Figure 12:
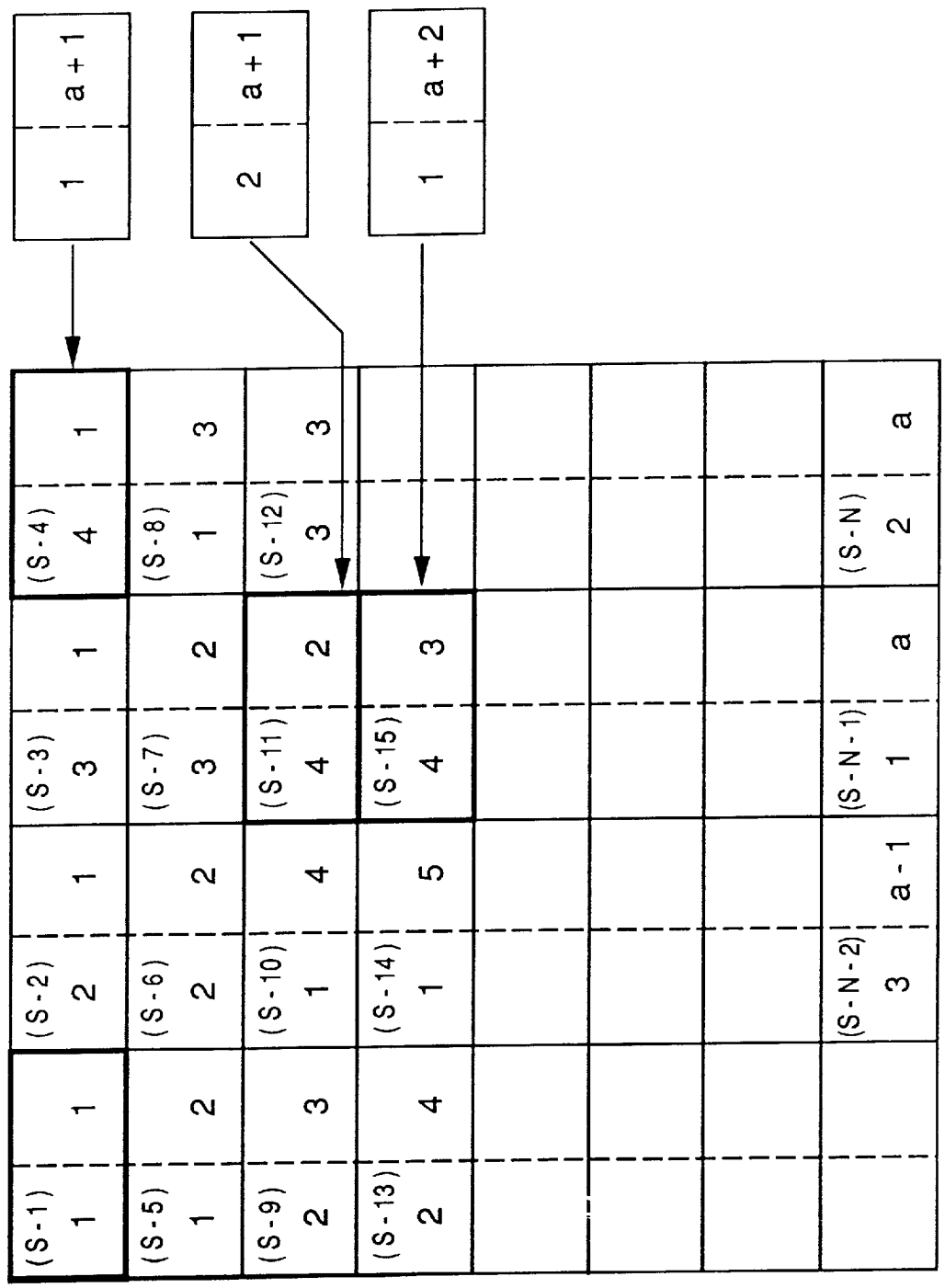
FIG. 12 illustrates a segment information table according to a ninth embodiment of the present invention.

FIG. 12 illustrates a segment information table according to a ninth embodiment of the present invention. Note that the construction of the overall image processing apparatus is similar to that in FIG. 4, as an example.

In FIG. 12, cells correspond to segments in the compressed data memory 113, and numerals in brackets denote segment numbers. Stage numbers are marked in the left parts within the cells separated by a dotted line, and ordinal numbers indicative of selection order of segments in the respective stages are marked in the right parts.

According to this table, segment S-1 is a segment selected first in the stage (1); S-2, a segment selected first in the stage (2); S-3, a segment selected first in the stage (3); S-4, a segment selected first in the stage (4); and S-5, a segment selected secondly in the stage (1). In this manner, when a segment is selected, a stage to which the segment is assigned and an ordinal number indicative of the selection order of segments in the stage are written into the segment table.

If a N-th (the last) segment is selected and the coding is not completed yet, the stage (4), in which the data of the highest frequency components are processed is "cancelled". Coded data by the other stages are written into the segment S-4, S-11 and S-15 in which coded data by the stage (4) have been written. In the segment S-4, the stage number "4" and the ordinal number "1" are respectively changed into "1" and "a+1", in the segment S-11, the stage number "4" and the selection order "2" are changed into "2" and "a+1", and in the segment S-15, the stage number "4" and the selection number "3" are changed into "1" and "a+2".

Difference between the segment table in FIG. 8 and that in FIG. 12 is that memory capacity for the table in FIG. 12 is smaller than that in FIG. 8. In case of FIG. 8, quantity of data stored in the segment information table is larger than that in FIG. 12 because of the advance memory amount used by the END marks where coding has been completed and the writing of segment numbers into a "cancelled" stage.

<Tenth Embodiment>

Figure 13:
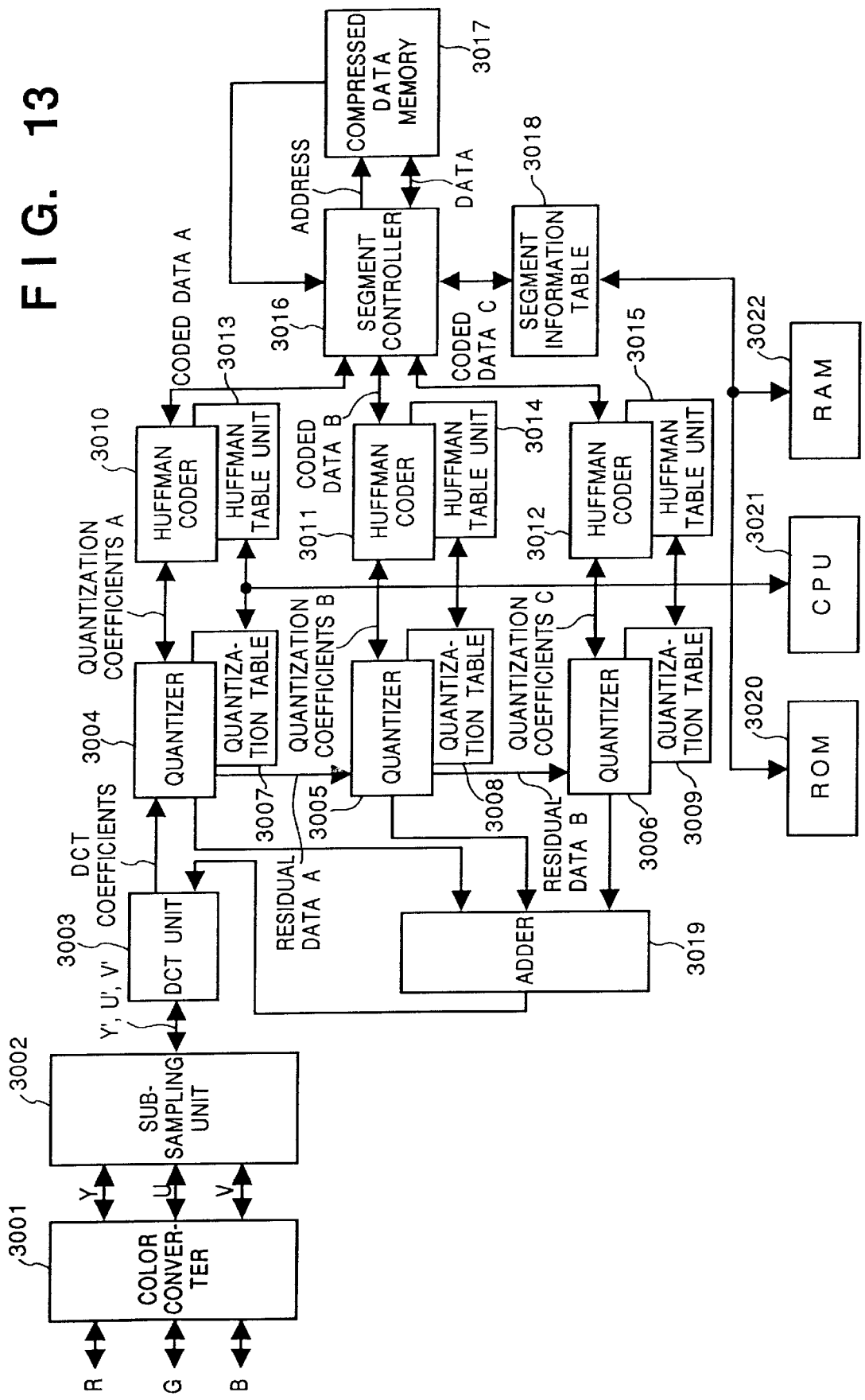
FIG. 13 is a block diagram showing a configuration of an image processing apparatus according to a tenth embodiment of the present invention.

FIG. 13 is a block diagram showing a configuration of an image processing apparatus according to a tenth embodiment of the present invention. In FIG. 13, a CPU 3021 controls the overall apparatus and performs setting of various tables (e.g., quantization tables 3007, 3008 and 3009, Huffman table units 3013, 3014 and 3015, and a segment information table 3018). The various tables are stored in a ROM 3020. A RAM 3022 is a work area for table setting and the like.

Next, compression of image data in this embodiment will be described below.

A color converter 3001 in FIG. 13 converts input RGB image data into YUV data in the above-described expression (1).

In a subsampling unit 3002, subsampling is performed, based on the characteristics of human eye which is more sensitive to the luminance (Y) component than to the chrominance (U, V) components, as Y:U:V=4:4:4 (subsampling is not performed), Y:U:V=4:2:2 or Y:U:V= 4:1:1. If Y:U:V=4:4:4, Y1, U1, V1, Y2, U2, V2 . . . are outputted by 8×8 block unit. If Y:U:V=4:2:2, Y1, Y2, U1, V1, Y3, Y4, U2, V2 . . . , and if Y:U:V=4:1:1, Y1, Y2, Y3, Y4, U1, V1, Y5, Y6, Y7, Y8, U2, V2 . . . are outputted also by 8×8 block unit.

In a DCT unit 3003, the data are discrete cosine transformed by 8×8 blocks to obtain DCT coefficients. The DCT coefficients are quantized, and then Huffman-coded using the quantization tables and Huffman tables prepared for quantization stages (a quantizer 3004, the quantization table 3007, a Huffman coder 3010 and the Huffman table unit 3013 for the first stage; a quantizer 3005, the quantization table 3008, a Huffman coder 3011 and the Huffman table unit 3014 for the second stage; and a quantizer 3006, the quantization table 3009, a Huffman coder 3012 and the Huffman table unit 3015 for the third stage).

The CPU 3021 sets appropriate data to the quantization tables and the Huffman tables in the respective stages. Further, the CPU 3021 counts the number of elements except "0" (zero) within 64 elements (number of non-zero element "n") in the 8×8 quantization tables in the respective stages and stores the number into the respective Huffman tables. The respective Huffman table units include a Huffman table and a number of non-zero element.

Figure 14:
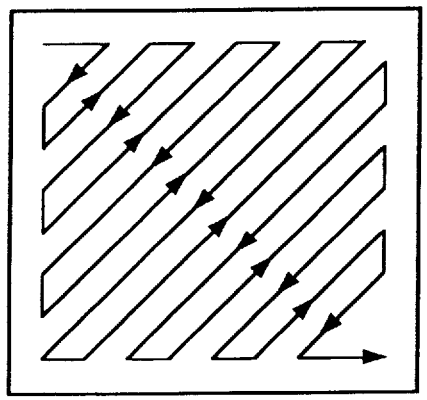
FIG. 14 illustrates zigzag scanning of quantization coefficients in the tenth embodiment.

In the first stage, the quantizer 3004 quantizes the DCT coefficients by values of the non-zero elements in the quantization table 3007. The obtained two-dimensional 8×8 quantization coefficients with respect to the non-zero elements are one-dimensionally aligned from lower frequency components to higher frequency components by zigzag scanning as shown in FIG. 14 and transferred to the Huffman coder 3010.

The Huffman coder 3010 encodes the quantization coefficients by "n" unit (the number of non-zero elements in the Huffman table unit 3013) using the Huffman table and transfers the results to a segment controller 3016. Quantization errors generated in the quantization as residual data A are transferred to the quantizer 3005. It should be noted that the zero elements in the quantization table 3007 are not quantized and the DCT coefficients of the zero elements are transferred to the segment controller 3016.

In the second stage, the quantizer 3005 quantizes the residual data A from the quantizer 3004 by values of the non-zero elements in the quantization table 3008. The obtained 8×8 two-dimensional quantization coefficients with respect to the non-zero elements are one-dimensionally aligned from lower frequency components to higher frequency components by the zigzag scanning as shown in FIG. 14. The Huffman coder 3011 encodes the quantization coefficients by "n" unit (the number of non-zero elements in the Huffman table unit 3014) using the Huffman table and transfers the results to the segment controller 3016. Quantization errors as residual data B are transferred to the quantizer 3006. With respect to the non-zero elements in the quantization table 3008, the residual data A corresponding to the elements are transferred to the segment controller 3016.

In the third stage, the quantizer 3006 quantizes the residual data B from the quantizer 3005 by values of the non-zero elements in the quantization table 3009. The obtained 8×8 two-dimensional quantization coefficients with respect to the non-zero elements are one-dimensionally aligned from lower frequency components to higher frequency components by the zigzag scanning as shown in FIG. 14 and transferred to the Huffman coder 3012. The Huffman coder 3012 encodes the quantization coefficients by "n" unit (the number of non-zero elements in the Huffman table unit 3015) using the Huffman table and transfers the results to the segment controller 3016.

The segment controller 3016 writes coded data A, B and C from the respective stages into a compressed data memory 3017 divided into a plurality of segments in the respective stages. The segment controller 3016 also writes information assigned to the respective segments into a segment information table 3018 for data expansion. The segment controller 3016 controls segments into which the data from the stages are stored, so that fixed length compression can be realized.

The abovementioned fixed length compression will be briefly described below.

The data from the respective stages are selected in accordance with the memory capacity of the compressed data memory 3017 or quantity of the whole compressed data of an object image, i.e., only the data from the first stage, the data from the first and second stages, or the data from the first to third stages are employed. A target quantity of compressed data can be obtained by employing stages selectively.

For example, a case where the quantity of data in the first stage is 3.0 Mbyte, that in the second stage is 1.5 Mbyte and that in the third stage is 0.8 Mbyte, and a target quantity of data is 5.0 Mbyte will be considered. By employing the data in the first and second stages, the quantity of whole compressed data will be 4.5 Mbyte, obtaining the target quantity. In this manner, selection of stages influences precision of fixed length compression.

Next, expansion of the data compressed in the abovementioned manner will be described below. It should be noted that in the image processing apparatus as shown in FIG. 13 in data expansion, the DCT unit 3003 is made into an inverse DCT unit 3003'; the quantizers 3004, 3005 and 3006, into inverse quantizers 3004', 3005' and 3006'; and the Huffman coders 3010, 3011 and 3012, into Huffman decoders 3010', 3011' and 3012'. The CPU 3021 performs setting of inverse quantization tables 3007', 3008' and 3009' in place of the quantization tables 3007, 3008 and 3009, and tables for Huffman decoding 3013', 3014' and 3015' in place of the Huffman tables 3013, 3014 and 3015.

The Huffman decoders 3010', 3011' and 3012' in the respective stages require coded data A, B and C from the segment controller 3016 in the respective stages. The segment controller 3016 transfers the coded data A, B and C from the compressed data memory 3017 to the Huffman decoders 3010', 3011' and 3012' in accordance with the segment information table 3018.

The Huffman decoders 3010', 3011' and 3012' decode the coded data A, B and C using the Huffman tables 3013', 3014' and 3015' by "n" unit (the number of non-zero elements) in the respective stages, and transfer the results (quantization coefficients A, B and C) to the inverse quantizers 3004', 3005' and 3006'. The inverse quantizers 3004', 3005' and 3006' inversely quantize only the non-zero elements in the inverse quantization tables 3007', 3008' and 3009' of the quantization coefficients A, B and C using the inverse quantization tables 3007', 3008' and 3009' to obtain DCT coefficients. Note that the DCT coefficients with respect to the zero elements are "0" (zero). The obtained DCT coefficients are transferred to the adder 3019 which adds the DCT coefficients and transfers the results to the inverse DCT unit 3003'.

The inverse DCT unit 3003' inversely discrete cosine transforms the DCT coefficients to obtain Y', U' and V' data. In the subsampling unit 3002, expansion operation is performed in accordance with the subsampling ratio (Y:U:V= 4:4:4, 4:2:2 or 4:1:1). The color converter 3001 inversely converts the expanded data to reproduce original image data in following expression:

$$\begin{bmatrix} R \\ G \\ B \end{bmatrix} = \begin{bmatrix} a_{11}' & a_{12}' & a_{13}' \\ a_{21}' & a_{22}' & a_{23}' \\ a_{31}' & a_{32}' & a_{33}' \end{bmatrix} \begin{bmatrix} Y \\ U \\ V \end{bmatrix} \quad (2)$$

As described above, according to this embodiment, the quantization errors in the first stage can be reduced in the second and the third stages by performing multistage quantization.

In quantization in the respective stages, the quantization area is variable within a predetermined block and only the quantized part is encoded using a Huffman table corresponding to the stage, avoiding waste in coding in the respective stages.

Further, quantity of compressed data can be precisely controlled since only the quantization area is encoded.

In this embodiment, the quantization stages are three, however, the present invention is not limited to the three stages, the number of stages can be increased such as four, five, six, etc. In those cases, the quantizers, the quantization tables, the Huffman coding units and the Huffman tables should be increased in accordance with the number of the tables.

<Eleventh Embodiment>

Figure 15:
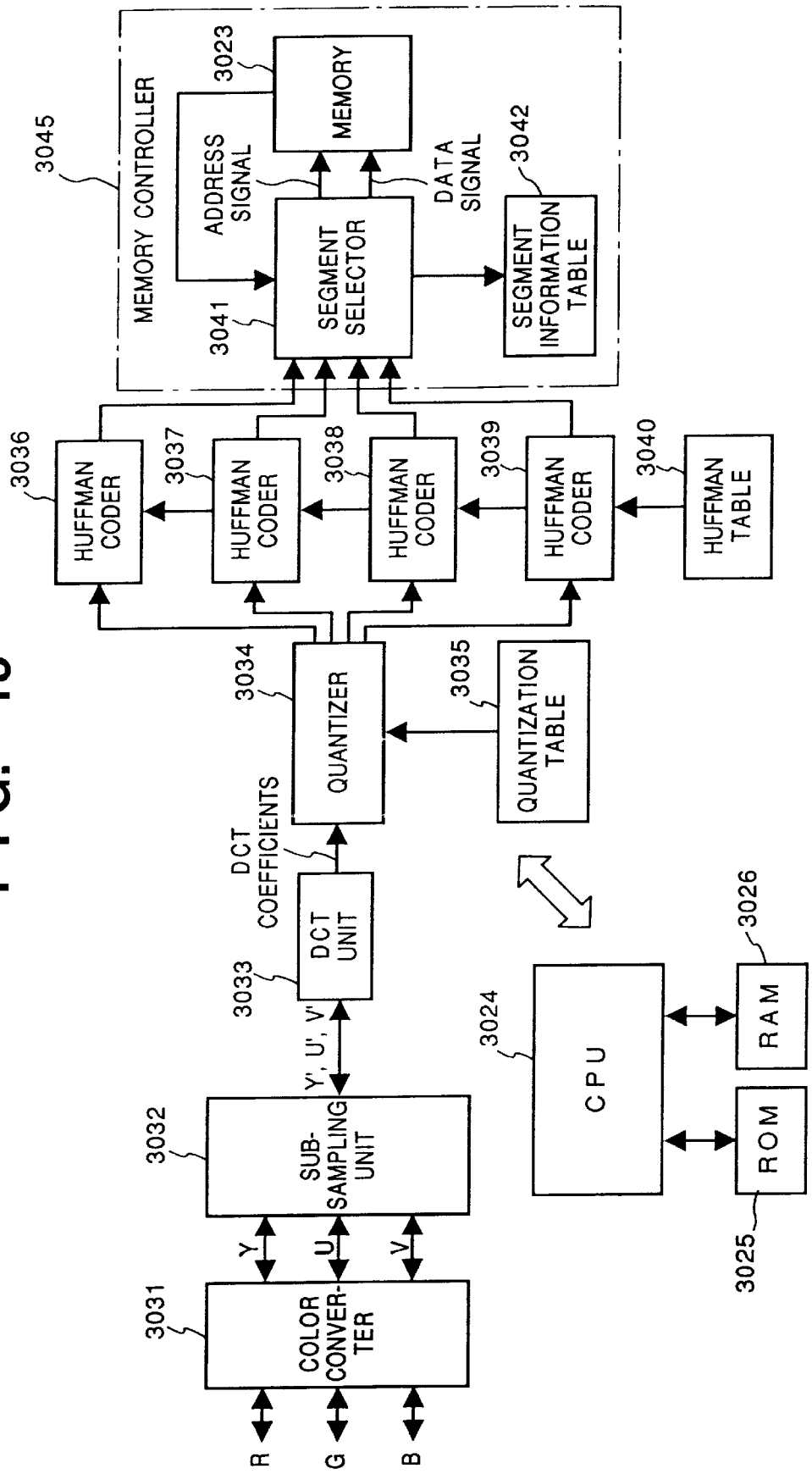
FIG. 15 is a block diagram showing a configuration of an image processing apparatus according to a eleventh embodiment of the present invention.

FIG. 15 is a block diagram showing a configuration of an image processing apparatus according to an eleventh embodiment of the present invention. In FIG. 15, a color converter 3031, a subsampling unit 3032 and a DCT unit 3033 have functions similar to those of the color converter, the subsampling unit and the DCT unit in the tenth embodiment. More specifically, the color converter 3031 performs 3×3 matrix linear transformation as shown in the expression (1), the subsampling unit 3032 subsamples the obtained YUV data and the DCT unit 3033 discrete cosine transforms the respective Y, U and V by 8×8 blocks to obtain DCT coefficients.

A quantizer 3034 quantizes the DCT coefficients by 8×8 blocks using a quantization table 3035. The obtained quantization coefficients are one-dimensionally aligned from lower frequency components to higher frequency components by zigzag scanning as shown in FIG. 14, similarly to the first embodiment.

Figure 16:
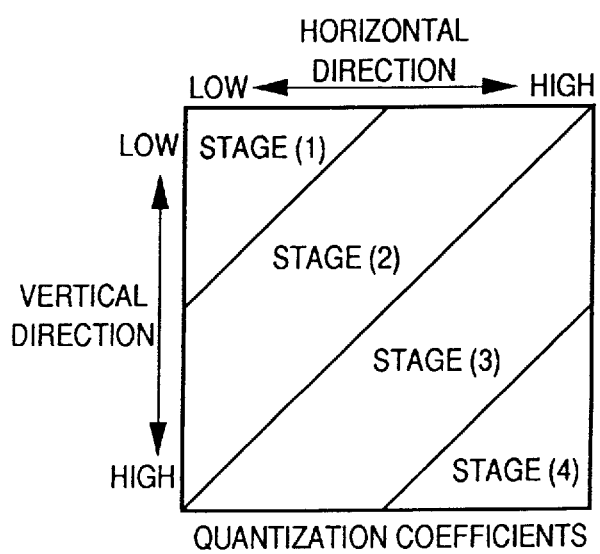
FIG. 16 illustrates divided quantization coefficients in the eleventh embodiment.

In the apparatus of this embodiment, the quantization coefficients one-dimensionally aligned from the lower frequency components to the higher frequency components are divided into a plurality of stages as shown in FIG. 16. More specifically, the quantization coefficients are assigned to first to fourth stages (stages (1) to (4)). Coding is respectively performed by a Huffman coder 3036 in the first stage, by a Huffman coder 3037 in the second stage, by a Huffman coder 3038 in the third stage and by a Huffman coder 3039 in the fourth stage. The results from the respective stages are transferred to a segment selector 3041 in a memory controller 3045. Note that all the Huffman coders 3036 to 3039 use a Huffman table 3040.

The segment selector 3041 writes the coded data from the respective stages into a memory 3023 divided into plural segments in the respective stages, and writes information assigned to the respective segments into a segment information table 3042 for data expansion. The segment selector 3041 controls the segments into which data from the respective stages are stored, so that fixed length compression can be realized.

Similarly to the tenth embodiment, expansion of the compressed data is realized by employing the coders in FIG. 15 as decoders, the quantizers as inverse quantizers and the DCT unit as an inverse DCT unit, therefore, detailed explanation of the data expansion will be omitted.

Next, real time storing of the compressed data from the plurality of stages into the memory divided into a plurality of segments will be described below.

Figure 17:
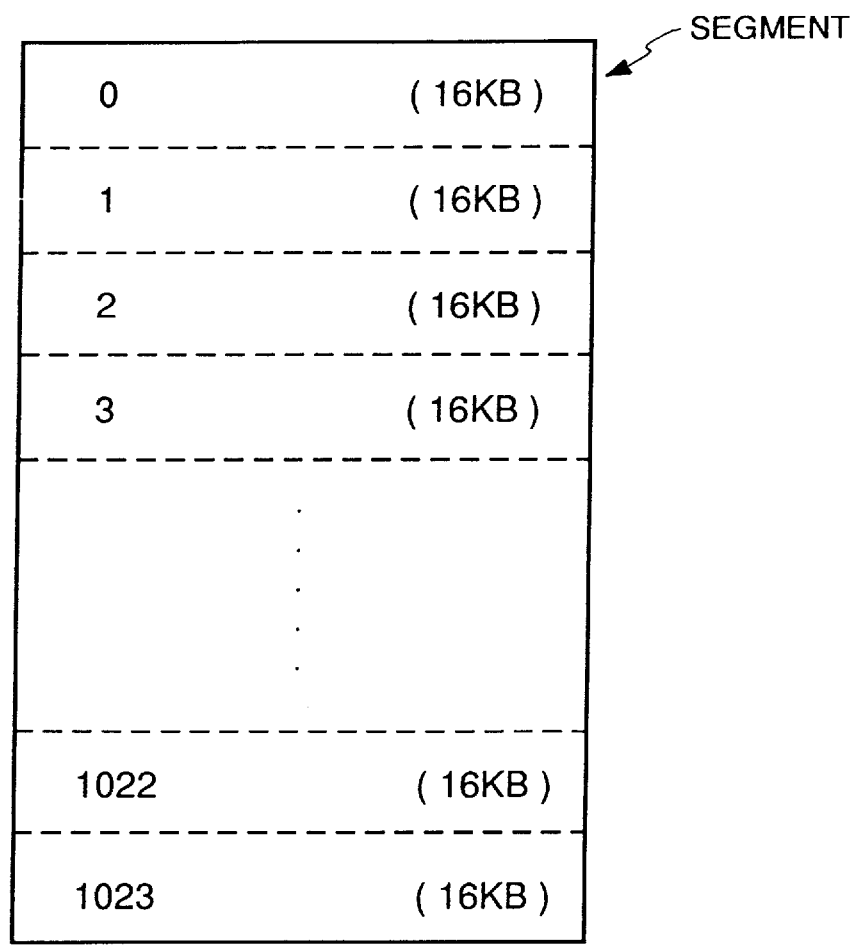
FIG. 17 is a diagram showing a configuration of a memory 3023 in the eleventh embodiment.
Figure 18:
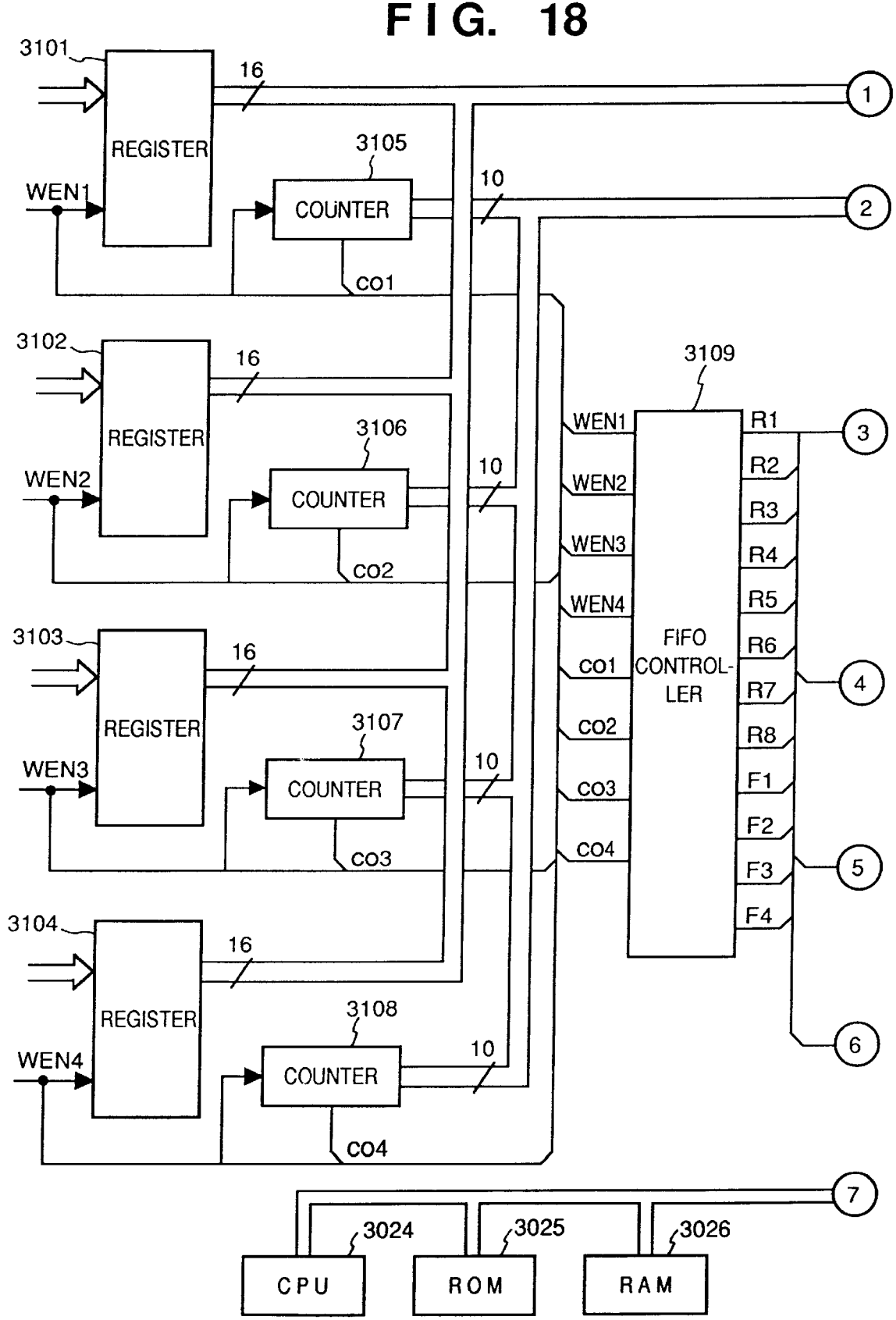
FIGS. 18 and 19 are a diagrams showing in detail circuits around the memory 3023 in the eleventh embodiment.
Figure 19:
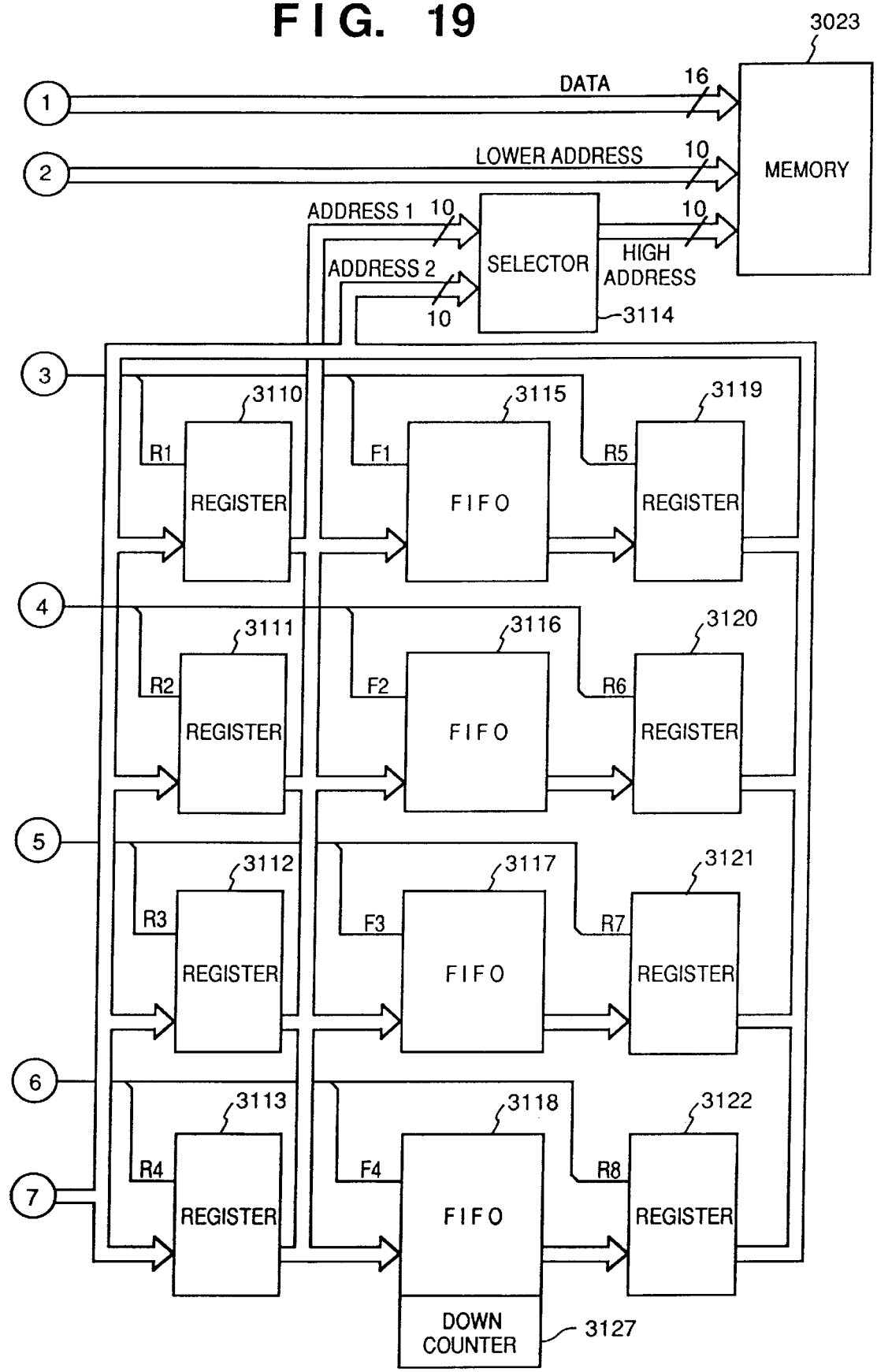

FIG. 17 shows a structure of the memory 3023 according to this embodiment. FIGS. 18 and 19 show circuits around the memory 3023.

As shown in FIG. 17, the memory 3023 has 1024 segments. The whole memory capacity is 16 Mbyte, and memory capacity of one segment is 16 Kbyte. The number of address bits is 23 bits (10 higher address bit and 13 lower address bit, and the number of data bits is 16 bits. The higher 10 bits are employed for selection of a segment, and the lower 13 bits, for addressing of 16 Kbyte of one segment.

As shown in FIGS. 18 and 19, 1024×10 bit buffers are employed as FIFO's 3115 to 3118, and 13 bit-output counters as counters 3105 to 3108 are employed for adressing respective segments. A selector 3114 selects an addresses 1 and 2 which become higher addresses on writing and reading of data into/from the memory 3023. A down counter 3127 counts down every time data are written into a register 3122 from the FIFO 3118. A CPU 3024 performs control of the overall apparatus including initial setting. In FIG. 18, control lines between the CPU 3024 and registers 3101 to 3104, the counters 3105 to 3108, the selector 3114 and the memory 3023 are omitted.

The coded data from the first to fourth stages are temporarily stored into the registers 3101 to 3104. More specifically, the coded data from the Huffman coder 3036 are written into the register 3101; coded data from the Huffman coder 3037, into the register 3102; coded data from the Huffman coder 3038, the register 3103; and coded data from the Huffman coder 3039, the register 3104. Further, segment numbers indicative of segments into which data from the respective stages are stored are written into the FIFO's 3115 to 3118.

Upon writing/reading of data into/from the memory 3023, a higher address (a segment number) is temporarily stored into the registers 3110 to 3113 and 3119 to 3122. Signals WEN1 to WEN4 are control signals for the registers 3101 to 3104; CO1 to CO4, control signals for the counters 3105 to 3108; R1 to R8 are control signals for the registers 3110 to 3113 and 3119 to 3122; and F1 to F4 are control signals for the FIFO's 3115 to 3118. These control signals are connected via a FIFO Controller 3109.

Next, writing/reading of data into/from the memory 3023 will be described in detail below.

[Data Writing Process]

(1) As initial setting, the CPU 3024 sets a segment number "0" to the FIFO 3115 into which a segment number corresponding to the first stage will be stored via the register 3110, then with respect to the second stage, sets a segment number "1" to the FIFO 3116 via the register 3111, and with respect to the third stage, sets a segment number "2" to the FIFO 3117 via the register 3112. To the FIFO 3118 having the lowest priority, a segment number "3" is set via the register 3113.

Segment numbers 4, 5 . . . 1023 are numbers of unselected segments. The number of these numbers "1020" is set in the down counter 3127. As the segment number "4" is set to the register 3122 from the FIFO 3118, the down counter 3127 counts down by one. Note that the segment numbers 0 to 3 are stored in the registers 3110 to 3113.

(2) After the initial setting, when the coded data from the first stage are written into the register 3101, the counter 3105 is selected by the signal WEN1. The output from the counter 3105 becomes a lower address in the memory 3023. Further, the signal WEN1 selects the register 3110 via the FIFO Controller 3109 by the signal R1. The output from the register 3110 becomes a higher address in the memory 3023. By this address setting, the coded data are stored from the register 3101 into the memory 3023. As the coded data are stored into the memory 3023, the counter 3105 counts up by one.

Similarly to the address setting in the first stage, the coded data from the second, third and fourth stages are respectively written into the registers 3101 to 3104, the counters 3106 to 3108 are employed for generating addresses, and the coded data are stored from the registers to the memory 3023.

(3) As described above, every time coded data are written into the registers 3101 to 3104, the coded data are stored into the memory 3023. If the counter 3105 counts up and becomes in a overflow status, the counter 3105 is reset for selecting a next segment. The segment number 4 which is a value in the register 3122 is written into the register 3110 by a signal R8 for outputting a read-out signal from the register 3122 or by the signal R1 for outputting a writing signal to the register 3111 via the FIFO Controller 3109 by the signals CO1 and WEN1 indicating the overflow status.

When the value of the register 3122 is read out, the unused segment number "5" is written from the FIFO 3118 into the register 3122, and the down counter 3127 counts down by one. As the data indicative of a segment number have been newly written into the register 3110, the value is stored into the FIFO 3115.

Similarly, if the counters 3106 to 3108 become in a overflow status, a value of the register 3122 is written into the registers 3111 to 3113 and the FIFO 3116 to 3118.

(4) In case where the operations (2) and (3) have been repeated and writing of the coded data has been completed, if available memory amount is left in the memory 3023, a read counter of the FIFO 3118 counts up by a value left in the down counter 3127, and a read counter in the FIFO 3118 counts up to an address of an initial value of the number of the segment in which used data in the fourth stage are stored.

(5) In case where the memory 3023 becomes full after the operations of (2) and (3) have been repeated and before the writing of the coded data is completed, the fourth stage is cancelled, and subsequent coded data from the first to third stages are stored into the segments in which the coded data from the fourth stage have been stored. The segment numbers stored in the FIFO 3118 are written into the registers 3110 to 3112 and the FIFO 3115 to 3117 using the register 3122 similarly to the operation (3).

(6) In case where the memory 3023 becomes full after the operations (2), (3) and (5) have been repeated and before the writing of the coded data is completed, the third stage is cancelled. Subsequent coded data from the first and second stages are stored into the segments in which the coded data from the third stage have been stored. If the available memory amount of the memory 3023 is still not enough, the second stage is cancelled, and subsequent coded data from the first stage are stored into the segment in which the coded data from the second stage have been stored.

(7) With respect to the stages cancelled in the operations (5) and (6), used/cancelled flag registers (not shown) are set so that the status of the stages can be recognized in reading of the coded data.

[Data Reading Process]

(8) The CPU 3024 performs initialization of the registers, the counters, the selector and the FIFO's in the used stages for reading out of the coded data.

As an example, a case where the first, second and third stages are "used" and the fourth stage is "cancelled" will be descried below.

At first, the counters 3105 to 3107 are reset, the segment numbers are written from the FIFO's 3115 to 3117 into the registers 3119 to 3121, and the register 3101 is accessed by the signal WEN1, which selects the counter 3105. The output from the counter 3105 becomes a lower address in the memory 3023. Further, the signal WEN1 selects the register 3119 via the FIFO Controller 3109 by a signal R5. The output from the register 3119 becomes a higher address in the memory 3023.

Data in the memory 3023 indicated by the higher address and the lower address are stored into the register 3101, at the same time, the counter 3105 counts up by one. Similarly, with respect to the registers 3102 and 3103, the coded data in the memory 3023 are stored by the counters 3106 and 3107, and the registers 3120 and 3121. The counters 3106 and 3107 also count up by one.

(9) The Huffman coders 3036 to 3039 as shown in FIG. 15 refer to the used/cancelled flag registers and access only the registers in the "used" stages. In this operation, the "used" stages are the first, second and third stages.

As the register 3101 is selected by the signal WEN1 and the content of the register 3101 is read out, the counter 3105 is selected by the signal WEN1 so that a value of the next 16 bit is set to the register 3101. The output from the counter 3105 becomes a lower address in the memory 3023. Further, the register 3119 is selected by the signal WEN1 via the FIFO Controller 3109. The output from the register 3119 becomes a higher address in the memory 3023. The coded data indicated by the higher address and the lower address are written from the memory 3023 into the register 3101. When the coded data are written into the register 3101, the counter 3105 counts up by one.

Similarly to the register 3101, with respect to the registers 3102 and 3103, a lower address and a higher address of next coded data to be read out by the Huffman coder are generated by the counters 3106 and 3107, and the registers 3120 and 3121, then the coded data are written from the memory 3023 into the registers 3102 and 3103. Note that the counters 3106 and 3107 count up by one on writing of data into the registers 3102 and 3103.

(10) In the operation (9), if the counter 3105 counts up and becomes in an overflow status, the counter 3105 is reset and a value in the FIFO 3115 is written into the register 3119. With respect to the counter 3106, the FIFO 3116 and the register 3120 in the second stage, and the counter 3107, the FIFO 3117 and the register 3121 in the third stage, similar processes are performed for the next segment selection.

(11) By repeating the operations (9) and (10) till all the contents in the FIFO's are read out, all the data stored in the memory 3023 are read out by the Huffman decoder via the registers 3101, 3102 and 3103.

In this manner, the multistaged data are written into the registers divided into plural segments and stored in accordance with the contents of segment information. This enables efficient real time storing of the multistaged data.

In this embodiment, an image processing apparatus which compresses image data is employed, however, the present invention is not limited to the above apparatus. Any apparatus which stores data from plural stages having different priorities can be employed. Further, the number of the stages in this embodiment is four, however, the present invention is not limited to this number. The number of the stages can be changed to, e.g., two, three, five, six, seven, etc. In those cases, the number of the registers and the counters should be changed in accordance with the number of the stages.

Further, the configuration of the memory is not limited to that as shown in FIG. 17, it can be arranged in any way as far as the memory can be divided into segments by the number of higher address bit and that of lower address bit. The FIFO's are not limited to 1024×10 bit FIFO's, FIFO's having (the number of segments in the memory)×(the number of higher address bit in the memory) number of bit can be employed.

As described above, according to this embodiment, degradation of image in data compression can be reduced by multistage quantization and coding. By making quantization area and coding area variable, quantity of compressed data can be controlled and a target quantity of data can be obtained.

Further, by storing multistaged data into a memory divided into plural segments and storing the data in accordance with segment information, the multistaged data can be efficiently stored.

As described above, according to the present invention, degradation of image quality can be prevented, and efficient data compression can be realized.

The present invention can be applied to a system constituted b a plurality of devices, or to an apparatus comprising a simple device. Furthermore, it goes without saying that the invention is applicable also to a case where the object of the invention is attained by supplying a program to a system or apparatus.

As described above, according to the embodiments of the present invention, in progressive coding, scanning time can be shortened by reduction of number of times of scanning, further, a memory having a large capacity for one image can be omitted, and fixed length compression can be realized.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting image data;
    quantization means for quantizing the image data in units of blocks; and
    generation means for generating plural kinds of quantization tables, each of which comprises a plurality of coefficients and is defined in consideration of preservation of information in frequency space,
    wherein said quantization means is a single unit and quantizes the image data by using a first quantization table of said plural kinds of quantization tables and further quantizes quantization errors which are generated by quantizing the image data by using a second quantization table of the plurality of quantization tables.

2. An image processing apparatus according to claim 1, further comprising a buffer memory for storing said quantization errors.

3. An image processing apparatus according to claim 1, wherein said image data comprises spatial frequency components.

4. An image processing apparatus according to claim 1, further comprising encoding means for encoding output data from said quantization means.

5. An image processing apparatus according to claim 4, further comprising memory means for storing the output data of said encoding means.

6. An image processing apparatus according to claim 1, wherein the image data includes a plurality of color components.

7. An image processing apparatus according to claim 6, wherein the plurality of color components include a luminance component and a chrominance component.

8. An encoding apparatus for encoding multi-value image data comprising:
    input means for inputting multi-value image data;
    a single quantization unit, including:
        first quantization means for generating first encoded data by quantizing the multi-value image data input by said input means using a first quantization table defined in consideration of preservation of information in frequency space;
        second quantization means for generating second encoded data by quantizing quantization errors generated by said first quantization means using a second quantization table defined in consideration of preservation of information in frequency space; and
        third quantization means for generating third encoded data by quantizing quantization errors generated by said second quantization means using a third quantization table defined in consideration of preservation of information in frequency space; and
    output means for sequentially outputting said first encoded data, said second encoded data and said third encoded data.

9. The apparatus according to claim 8, wherein said multi-value image data comprises information representing an image by space frequency components.

10. The apparatus according to claim 8, further comprising control means for controlling execution of said third quantization means based on the amount of encoded data generated by said first and second quantization means.

11. An encoding method for encoding multi-value image data comprising:
    an input step of inputting multi-value image data;
    a multi-level quantization step performed in a single quantizing unit, said multi-level quantization step including:
        a first quantization step of generating first encoded data by quantizing the multi-value image data input in said input step using a first quantization table defined in consideration of preservation of information in frequency spaces;
        a second quantization step of generating second encoded data by quantizing quantization errors generated by performing said first quantization step using a second quantization table defined in consideration of preservation of information in frequency space; and
        a third quantization step of generating third encoded data by quantizing quantization errors generated by performing said second quantization step using a third quantization table defined in consideration of preservation of information in frequency space; and
    an output step of sequentially outputting said first encoded data, said second encoded data and said third encoded data.

12. The method according to claim 11, wherein said multi-value image data comprises information representing an image by space frequency components.

13. The method according to claim 11, further comprising a control step of controlling execution of said third quantization step based on the amount of encoded data generated by said first and second quantization steps.

14. An encoding apparatus for encoding multi-value image data comprising:
    input means for inputting multi-value image data;
    a single encoding unit, including:
        first encoding means for generating first encoded data by quantizing the multi-value image data input by said input means using a first quantization table defined in consideration of preservation of information in frequency space;
        second encoding means for generating second encoded data by quantizing quantization errors generated by said first encoding means using a second quantization table defined in consideration of preservation of information in frequency space; and
        third encoding means for generating third encoded data by quantizing quantization errors generated by said second encoding means using a third quantization table defined in consideration of preservation of information in frequency space; and
    output means for sequentially outputting said first encoded data, said second encoded data and said third encoded data.

15. An encoding method for encoding multi-value image data comprising:
    an input step of inputting multi-value image data;
    a multi-level encoding step performed in a single encoding unit, said multi-level encoding step including:
        a first encoding step of generating first encoded data by quantizing the multi-value image data input in said input step using a first quantization table defined in consideration of preservation of information in frequency space;

a second encoding step of generating second encoded data by quantizing quantization errors generated by performing said first encoding step using a second quantization table defined in consideration of preservation of information in frequency space; and a third encoding step of generating third encoded data by quantizing quantization errors generated by performing said second encoding step using a third quantization table defined in consideration of preservation of information in frequency space; and an output step of sequentially outputting said first encoded data, said second encoded data and said third encoded data.

\* \* \* \* \*